US012585948B2

(12) United States Patent
Oh

(10) Patent No.: US 12,585,948 B2
(45) Date of Patent: *Mar. 24, 2026

(54) NEURAL PROCESSING DEVICE AND METHOD FOR PRUNING THEREOF

(71) Applicant: Rebellions Inc., Seongnam-si (KR)

(72) Inventor: Jinwook Oh, Seongnam-si (KR)

(73) Assignee: Rebellions Inc., Seongnam-si (KR)

( * ) Notice: Subject to any disclaimer, the term of this patent is extended or adjusted under 35 U.S.C. 154(b) by 1043 days.

This patent is subject to a terminal disclaimer.

(21) Appl. No.: 17/655,348

(22) Filed: Mar. 17, 2022

(65) Prior Publication Data

US 2022/0300816 A1 Sep. 22, 2022

(30) Foreign Application Priority Data

Mar. 19, 2021 (KR) ........................ 10-2021-0036119
Mar. 19, 2021 (KR) ........................ 10-2021-0036120
Mar. 11, 2022 (KR) ........................ 10-2022-0030586

(51) Int. Cl.
*G06N 3/082* (2023.01)
*G06F 9/30* (2018.01)
(Continued)

(52) U.S. Cl.
CPC ......... *G06N 3/082* (2013.01); *G06F 9/30036* (2013.01); *G06F 9/3887* (2013.01); *G06N 3/063* (2013.01)

(58) Field of Classification Search
CPC .. G06F 9/30036; G06F 9/3887; G06F 9/3834; G06N 3/082; G06N 3/063; G06N 3/0464; G06N 3/084; G06N 3/0495
See application file for complete search history.

(56) References Cited

U.S. PATENT DOCUMENTS 11,449,756 B2  9/2022  Deng
12,061,988 B1 *  8/2024  Sather ................... G06F 9/3455
(Continued)

FOREIGN PATENT DOCUMENTS

KR  10-2020-0034918 A  4/2020
KR  10-2020-0093404 A  8/2020
KR  10-2258566 B1  5/2021

OTHER PUBLICATIONS

Hegde, K. et al., "UCNN: Exploiting Computational Reuse in Deep Neural Networks via Weight Repetition", https://ieeexplore.ieee.org/abstract/document/8416864 (Year: 2018).*
(Continued)

*Primary Examiner* — Alexey Shmatov
*Assistant Examiner* — Devika S Maharaj
(74) *Attorney, Agent, or Firm* — BROADVIEW IP LAW, PC

(57) ABSTRACT

A neural processing device and method for pruning thereof are provided. The neural processing device includes a processing unit configured to perform calculations, an L0 memory configured to store input and output data of the processing unit, wherein the input and output data include a two-dimensional weight matrix and a weight manipulator configured to receive the two-dimensional weight matrix and partition it into preset sizes to thereby generate partitioned matrices, to generate a pruning matrix by pruning the partitioned matrix, and to transmit the pruning matrix to the processing unit.

18 Claims, 30 Drawing Sheets

(51) Int. Cl.
  *G06F 9/38* (2018.01)
  *G06N 3/063* (2023.01)

(56) References Cited

U.S. PATENT DOCUMENTS

| | | | | |
|---|---|---|---|---|
| 2018/0373978 | A1* | 12/2018 | Yu | G06N 3/0495 |
| 2020/0097830 | A1* | 3/2020 | Deng | G06N 3/042 |
| 2021/0182077 | A1* | 6/2021 | Chen | G06F 40/263 |
| 2022/0075622 | A1* | 3/2022 | Xue | G06F 9/3017 |

OTHER PUBLICATIONS

Yu, Jiecao (2017) "Scalpel: Customizing DNN Pruning to the Underlying Hardware Parallelism," ACM SIGARCH Computer Architecture News 45.2, doi: 10.1145/3079856.3080215.

Awad, Omar M. (2020) "FPRAKER: Exploiting Fine-Grain Sparsity to Accelerate Neural Network Training," University of Toronto.

Zhao, Xiandong (2020) "BitPruner: Network Pruning for Bit-serial Accelerators," 57th ACM/IEEE Design Automation Conference.

Office Action for KR 10-2021-0062969 by Korean Intellectual Property Office dated Jul. 17, 2024.

Office Action for KR 10-2021-0062970 by Korean Intellectual Property Office dated Jul. 19, 2024.

Non-Final Office Action of Korean Patent application No. 10-2021-0036119, Korean Intellectual Property Office, Apr. 13, 2021.

Jeonggyu Jang et al., Work-in-Progress: A SIMD-Aware Pruning Technique for Convolutional Neural Networks with Multi-Sparsity Levels, the CODES / ISSS, 1-2 pages (Oct. 2019.).

Juhyun Kim et al., Neural Network Optimization for GPU-based Deep Learning Applications Using Weight Matrix Rearrangement, The Korean Institute of Information Scientists and Engineers, Dec. 2016, 45-47 pages.

Non-Final Office Action of Korean Patent application No. 10-2021-0036120, Korean Intellectual Property Office, Apr. 7, 2021.

Song Han et al., Deep Compression: Compressing Deep Neural Networks With Pruning, Trained Quantization and Huffman Coding, arXiv:1510.00149v5, 1-14 pages (Feb. 15, 2016).

* cited by examiner

NPS

FIG.30

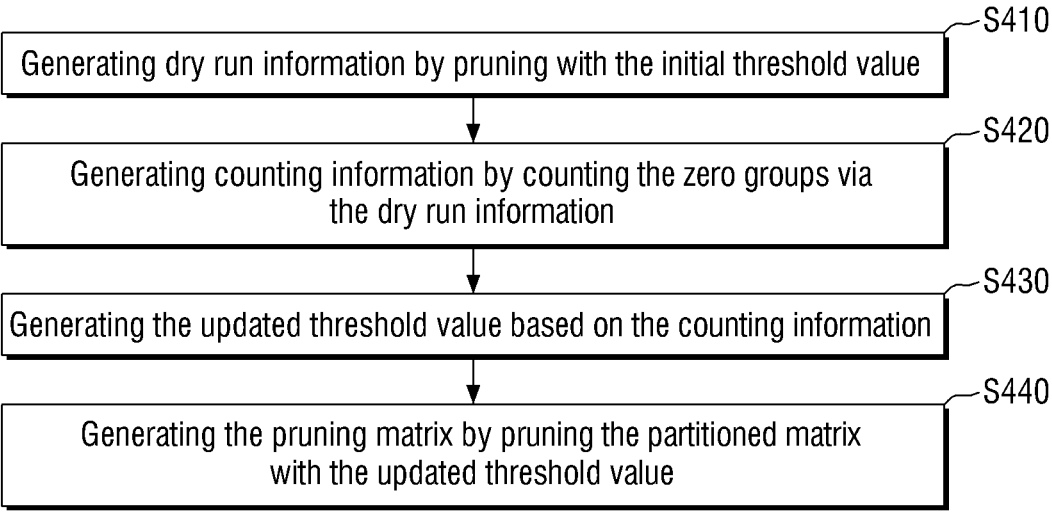

S410
Generating dry run information by pruning with the initial threshold value

S420
Generating counting information by counting the zero groups via the dry run information S430
Generating the updated threshold value based on the counting information S440
Generating the pruning matrix by pruning the partitioned matrix with the updated threshold value

FIG.31

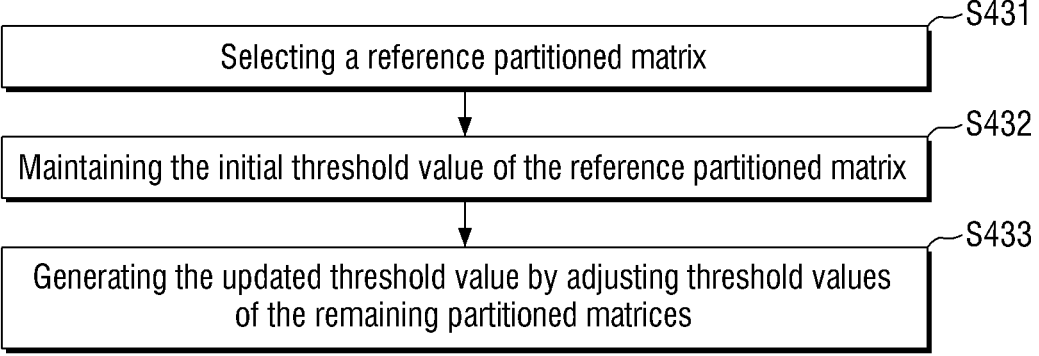

S431
Selecting a reference partitioned matrix

S432
Maintaining the initial threshold value of the reference partitioned matrix S433
Generating the updated threshold value by adjusting threshold values of the remaining partitioned matrices

NEURAL PROCESSING DEVICE AND METHOD FOR PRUNING THEREOF

CROSS-REFERENCE TO RELATED APPLICATIONS

This application is based on and claims priority under 35 U.S.C. 119 to Korean Patent Application No. 10-2021-0036119 filed in the Korean Intellectual Property Office on Mar. 19, 2021, Korean Patent Application No. 10-2021-0036120 filed in the Korean Intellectual Property Office on Mar. 19, 2021, and Korean Patent Application No. 10-2022-0030586 filed in the Korean Intellectual Property Office on Mar. 11, 2022, the disclosure of which are herein incorporated by reference in its entirety.

FIELD OF THE DISCLOSURE

The present inventive concept relates to a neural processing device and a pruning method thereof. Specifically, the present inventive concept relates to a neural processing device and a pruning method thereof that have maximized the efficiency of weight pruning.

BACKGROUND

For the past few years, artificial intelligence technology has been the core technology of the Fourth Industrial Revolution and the subject of discussion as the most promising technology worldwide. The biggest issue with such artificial intelligence technology is computing performance. It is of utmost importance for artificial intelligence technology, which realizes human learning ability, reasoning ability, perceptual ability, natural language implementation ability, etc., to process a large amount of data quickly.

The central processing units (CPUs) or graphics processing unit (GPUs) of off-the-self computers were used for deep-learning training and inference in early artificial intelligence, but had limitations on the tasks of deep-learning training and inference with high workloads, and thus, neural processing units (NPUs) that are structurally specialized for deep learning tasks have received a lot of attention.

There are a very large number of weights in deep learning training, and even if some of this large number of pruning matrices are removed, the accuracy of actual training can be maintained to some extent. In addition, since reducing weights increases the speed of training and enhances the efficiency of hardware, an operation of removing some of the weights may be essential. This operation is called pruning.

SUMMARY OF THE INVENTION

Technical Objects

It is an object of the present inventive concept to provide a neural processing device that carries out efficient pruning.

It is another object of the present inventive concept to provide a method for pruning of a neural processing device that carries out efficient pruning.

The objects of the present inventive concept are not limited to those noted above, and other objects and advantages of the present inventive concept that have not been mentioned can be understood by the following description, and will be more clearly understood by embodiments of the present inventive concept. In addition, it will be readily appreciated that the objects and advantages of the present inventive concept can be realized by the means and combinations thereof set forth in the claims.

According to an aspect of the present inventive concept, there is provided a neural processing device, the neural processing device comprising a processing unit configured to perform calculations, an L0 memory configured to store input and output data of the processing unit, wherein the input and output data include a two-dimensional weight matrix and a weight manipulator configured to receive the two-dimensional weight matrix and partition it into preset sizes to thereby generate partitioned matrices, to generate a pruning matrix by pruning the partitioned matrix, and to transmit the pruning matrix to the processing unit.

In some embodiments of the present inventive concept, the processing unit comprises a PE array that performs two-dimensional calculations and that includes at least one processing element, and the processing element receives an input in SIMD (Single Instruction/Multiple Data).

In some embodiments of the present inventive concept, the size of the partitioned matrix is determined based on the width of the SIMD of the processing element.

In some embodiments of the present inventive concept, the weight manipulator comprises a width identifier configured to check the width of the SIMD of the processing element and generate a confirmation signal, a weight initializer configured to receive the confirmation signal and initialize the two-dimensional weight matrix, a matrix divider configured to partition the two-dimensional weight matrix according to the width of the SIMD of the processing element and generate the partitioned matrices and a pruner configured to generate the pruning matrix by pruning the partitioned matrix.

In some embodiments of the present inventive concept, the partitioned matrix contains at least one group, and the number of elements in the group is equal to the width of the SIMD of the processing element.

In some embodiments of the present inventive concept, the pruner is configured to generate a representative value of the group, and compare the representative value with a threshold value and determine whether to convert the group into a zero group.

In some embodiments of the present inventive concept, the two-dimensional weight matrix contains weights as elements, and the weights and the threshold value are trained via an artificial neural network.

In some embodiments of the present inventive concept, the threshold value comprises an initial threshold value and an updated threshold value, and the pruner generates dry run information by performing pruning through the initial threshold value, and generates the pruning matrix through the updated threshold value.

In some embodiments of the present inventive concept, the weight manipulator further comprises a load balance unit configured to receive the dry run information and generate the updated threshold value.

In some embodiments of the present inventive concept, the load balance unit comprises a zero group counter configured to receive the dry run information, to count zero groups, and to generate counting information, a threshold updater configured to receive the counting information and generate the updated threshold value.

In some embodiments of the present inventive concept, the updated threshold value comprises a partitioned matrix threshold value corresponding to each partitioned matrix.

According to another aspect of the present inventive concept, there is provided a method for pruning of a neural processing device, the method comprising checking the width of SIMD of a processing element, initializing a two-dimensional weight matrix, partitioning the two-dimensional weight matrix into partitioned matrices based on the width of the SIMD, and pruning the partitioned matrix using a threshold value.

In some embodiments of the present inventive concept, the partitioned matrix contains at least one group, and the group has a size equal to the width of the SIMD, and the pruning comprises generating a representative value of the group, and changing the group to a zero group if the representative value is less than or equal to the threshold value.

In some embodiments of the present inventive concept, the representative value comprises any one of a mean value, a minimum value, a maximum value, a median value, and a root mean square (RMS) value.

In some embodiments of the present inventive concept, the two-dimensional weight matrix contains at least one weight, the weight and the threshold value are trained via an artificial neural network, and the threshold value is trained in a direction in which the number of zero groups is uniformly distributed for each partitioned matrix.

In some embodiments of the present inventive concept, the threshold value comprises an initial threshold value and an updated threshold value, and the pruning comprises generating dry run information by pruning with the initial threshold value, generating counting information by counting the zero groups based on the dry run information, generating the updated threshold value based on the counting information, and generating the pruning matrix by pruning based on the updated threshold value.

In some embodiments of the present inventive concept, the generating the updated threshold value comprises selecting a partitioned matrix having the largest number of zero groups in the counting information as a reference partitioned matrix, maintaining an initial threshold value of the reference partitioned matrix, and adjusting threshold values of the remaining partitioned matrices other than the reference partitioned matrix.

In some embodiments of the present inventive concept, the pruning comprises generating a pruning matrix by pruning the partitioned matrix, and the pruning method of a neural processing device, further comprising performing, by the processing element, calculations using the pruning matrix.

In some embodiments of the present inventive concept, the pruning matrix contains at least one group, the at least one group comprises a zero group in which all elements are zero and a non-zero group in which at least one non-zero element is included, and the performing calculations comprises skipping the calculation of the zero group.

In some embodiments of the present inventive concept, the two-dimensional weight matrix is a form obtained by rearranging a four-dimensional tensor in two dimensions.

Effects of the Invention

The neural processing device of the present inventive concept can maximize the pruning efficiency by partitioning the weight matrix according to the width of the SIMD (Single Instruction/Multiple Data) of the processing element.

In addition, the number of zero groups in each matrix can be evenly balanced, thereby improving efficiency in parallel processing.

In addition to the foregoing, the specific effects of the present inventive concept will be described together while expounding the specific details for carrying out the invention below.

BRIEF DESCRIPTION OF THE DRAWINGS

FIG. 30 is a flowchart for illustrating in detail the step of generating a pruning matrix of FIG. 29; and FIG. 31 is a flowchart for illustrating in detail the step of generating an updated threshold value of FIG. 30.

DETAILED DESCRIPTION OF THE PREFERRED EMBODIMENTS

Figure 1:
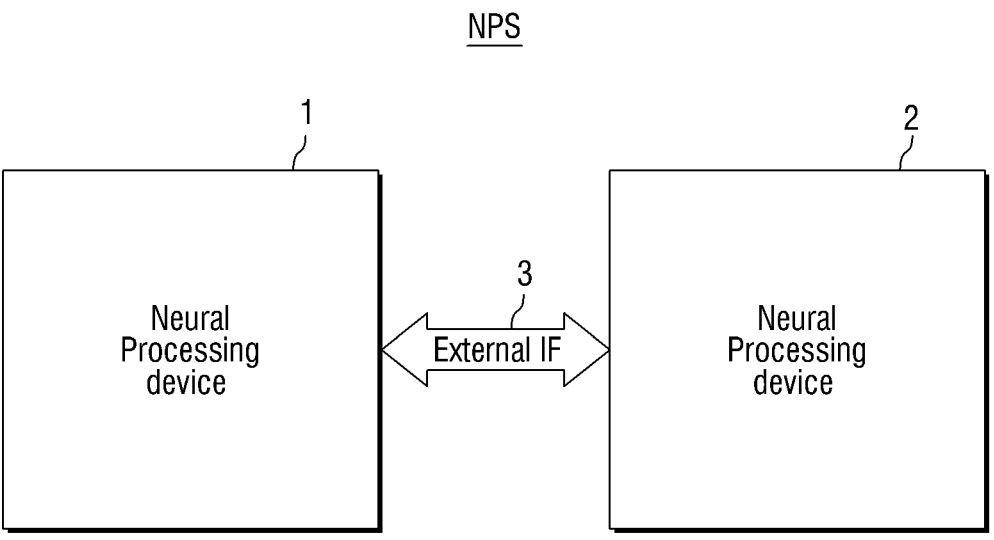
FIG. 1 is a block diagram for illustrating a neural processing system in accordance with some embodiments of the present inventive concept.

The present inventive concept will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity.

It will be understood that when an element or layer is referred to as being "connected to," or "coupled to" another element or layer, it can be directly connected to or coupled to another element or layer or intervening elements or layers may be present. In contrast, when an element is referred to as being "directly connected to" or "directly coupled to" another element or layer, there are no intervening elements or layers present. Like numbers refer to like elements throughout. As used herein, the term "and/or" includes any and all combinations of one or more of the associated listed items.

It will also be understood that when a layer is referred to as being "on" another layer or substrate, it can be directly on the other layer or substrate, or intervening layers may also be present. In contrast, when an element is referred to as being "directly on" another element, there are no intervening elements present.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present inventive concept.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

Hereinafter, a neural processing device in accordance with some embodiments of the present inventive concept will be described with reference to FIGS. 1 to 28.

FIG. 1 is a block diagram for illustrating a neural processing system in accordance with some embodiments of the present inventive concept.

With reference to FIG. 1, a neural processing system NPS in accordance with some embodiments of the present inventive concept may include a first neural processing device 1, a second neural processing device 2, and an external interface 3.

The first neural processing device 1 may be a device that performs calculations using an artificial neural network. The first neural processing device 1 may be, for example, a device specialized in performing the task of deep learning calculations. However, the present embodiment is not limited thereto.

The second neural processing device 2 may be a device having the same or similar configuration as the first neural processing device 1. The first neural processing device 1 and the second neural processing device 2 may be connected to each other via the external interface 3 and share data and control signals.

Although FIG. 1 shows two neural processing devices, the neural processing system NPS in accordance with some embodiments of the present inventive concept is not limited thereto. That is, in a neural processing system NPS in accordance with some embodiments of the present inventive concept, three or more neural processing devices may be connected to one another via the external interface 3. Also, conversely, a neural processing system NPS in accordance with some embodiments of the present inventive concept may include only one neural processing device.

Figure 2:
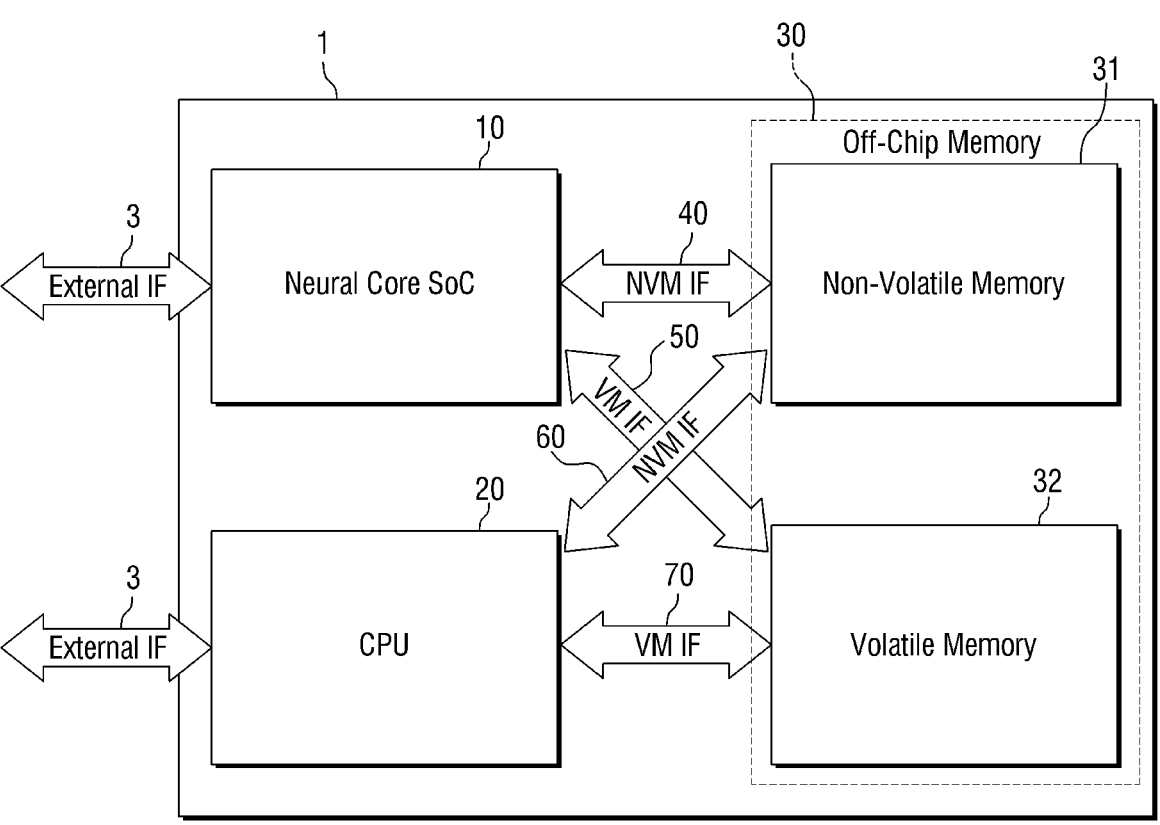
FIG. 2 is a block diagram for illustrating in detail the neural processing device of FIG. 1.

FIG. 2 is a block diagram for illustrating in detail the neural processing device of FIG. 1.

With reference to FIG. 2, the first neural processing device 1 may include a neural core SoC 10, a CPU 20, an off-chip memory 30, a first non-volatile memory interface 40, a first volatile memory interface 50, a second non-volatile memory interface 60, and a second volatile memory interface 70.

The neural core SoC 10 may be a system on a chip device. The neural core SoC 10 is an artificial intelligence calculation unit, which may be an accelerator. The neural core SoC 10 may be, for example, any one of a graphics processing unit (GPU), a field-programmable gate array (FPGA), and an application-specific integrated circuit (ASIC). However, the present embodiment is not limited thereto.

The neural core SoC 10 may exchange data with other external calculation units via the external interface 3. In addition, the neural core SoC 10 may be connected to the non-volatile memory 31 and the volatile memory 32 via the first non-volatile memory interface 40 and the first volatile memory interface 50, respectively.

The CPU 20 may be a control device that controls the system of the first neural processing device 1 and executes program calculations. The CPU 20 is a general-purpose calculation unit and may have low efficiency in performing simple parallel calculations that are used a lot in deep learning. Therefore, there can be high efficiency by performing calculations in deep learning inference and training tasks by the neural core SoC 10.

The CPU 20 may exchange data with other external calculation units via the external interface 3. Moreover, the CPU 20 may be connected to the non-volatile memory 31 and the volatile memory 32 via the second non-volatile memory interface 60 and the second volatile memory interface 70, respectively.

The off-chip memory 30 may be a memory placed outside the chip of the neural core SoC 10. The off-chip memory 30 may include the non-volatile memory 31 and the volatile memory 32.

The non-volatile memory 31 may be a memory that continuously retains stored information even when electric power is not supplied. The non-volatile memory 31 may include, for example, at least one of Read-Only Memory (ROM), Programmable Read-Only Memory (PROM), Erasable Alterable ROM (EAROM), Erasable Programmable Read-Only Memory (EPROM), Electrically Erasable Programmable Read-Only Memory (EEPROM) (e.g., NAND Flash memory, NOR Flash memory), Ultra-Violet Erasable Programmable Read-Only Memory (UVEPROM), Ferro-electric Random-Access Memory (FeRAM), Magnetoresistive Random-Access Memory (MRAM), Phase-change Random-Access Memory (PRAM), silicon-oxide-nitride-oxide-silicon (SONOS), Resistive Random-Access Memory (RRAM), Nanotube Random-Access Memory (NRAM), magnetic computer storage devices (e.g., hard disks, diskette drives, magnetic tapes), optical disc drives, and 3D XPoint memory. However, the present embodiment is not limited thereto.

The volatile memory 32 may be a memory that continuously requires electric power to retain stored information, unlike the non-volatile memory 31. The volatile memory 32 may include, for example, at least one of Dynamic Random-Access Memory (DRAM), Static Random-Access Memory (SRAM), Synchronous Dynamic Random-Access Memory (SDRAM), and Double Data Rate SDRAM (DDR SDRAM). However, the present embodiment is not limited thereto.

The first non-volatile memory interface 40 and the second non-volatile memory interface 60 may each include, for example, at least one of Parallel Advanced Technology Attachment (PATA), Small Computer System Interface (SCSI), Serial Attached SCSI (SAS), Serial Advanced Technology Attachment (SATA), and PCI Express (PCIe). However, the present embodiment is not limited thereto.

The first volatile memory interface 50 and the second volatile memory interface 70 may each be, for example, at least one of SDR (Single Data Rate), DDR (Double Data Rate), QDR (Quad Data Rate), and XDR (eXtreme Data Rate, Octal Data Rate). However, the present embodiment is not limited thereto.

Figure 3:
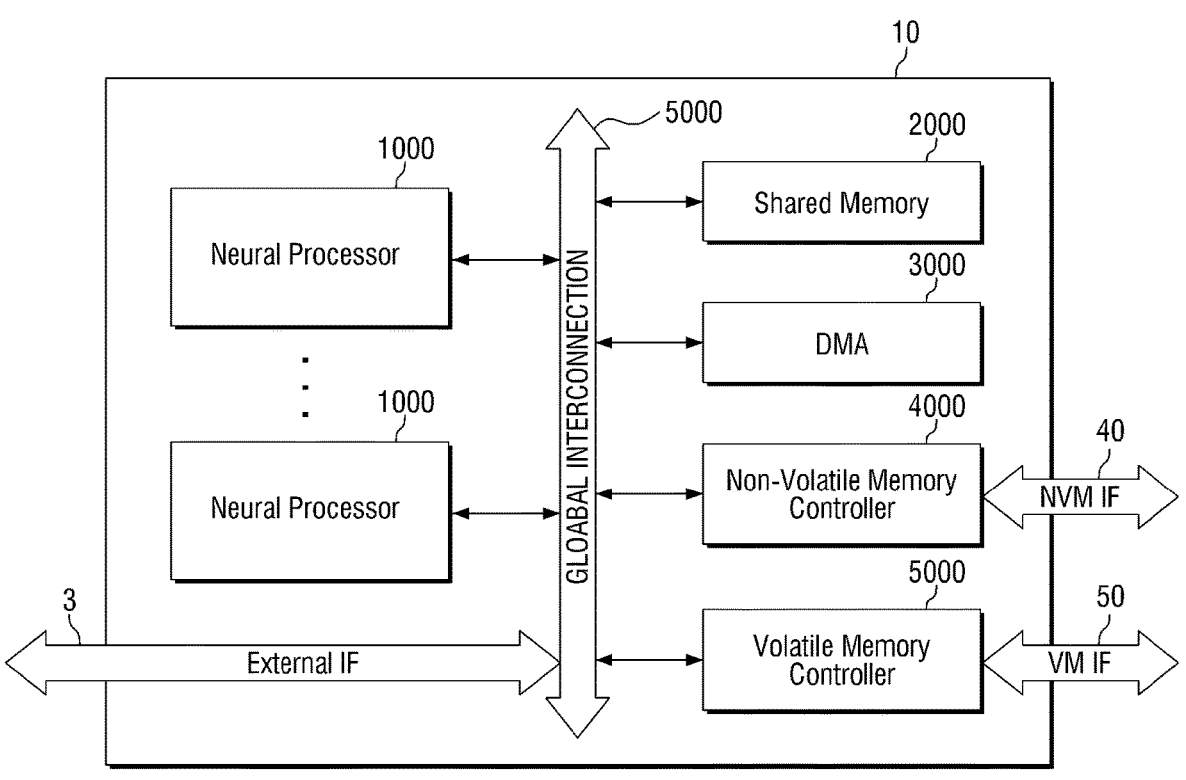
FIG. 3 is a block diagram for illustrating in detail the neural core SoC of FIG. 2.

FIG. 3 is a block diagram for illustrating in detail the neural core SoC of FIG. 2.

Referring to FIGS. 2 and 3, the neural core SoC 10 may include at least one neural processor 1000, a shared memory 2000, direct memory access (DMA) 3000, a non-volatile memory controller 4000, a volatile memory controller 5000, and a global interconnection 5000.

The neural processor 1000 may be a calculation unit that directly performs calculation tasks. If there exist neural processors 1000 in plurality, calculation tasks may be assigned to respective neural processors 1000. The respective neural processors 1000 may be connected to each other via the global interconnection 5000.

The shared memory 2000 may be a memory shared by multiple neural processors 1000. The shared memory 2000 may store data of each neural processor 1000. Further, the shared memory 2000 may receive data from the off-chip memory 30, store them temporarily, and transfer them to each neural processor 1000. On the contrary, the shared memory 2000 may also receive data from the neural processor 1000, store them temporarily, and transmit them to the off-chip memory 30 of FIG. 2.

The shared memory 2000 may need a relatively high-speed memory. Accordingly, the shared memory 2000 may include, for example, an SRAM. However, the present embodiment is not limited thereto. That is, the shared memory 2000 may include a DRAM as well.

The shared memory 2000 may be a memory corresponding to the SoC level, i.e., level 3 (L3). Therefore, the shared memory 2000 may also be defined as an L3 shared memory.

The DMA 3000 may directly control the movement of data without the need for the neural processor 1000 to control the input and output of data. Accordingly, the DMA 3000 may control the data movement between memories, thereby minimizing the number of interrupts of the neural processor 1000.

The DMA 3000 may control the data movement between the shared memory 2000 and the off-chip memory 30. Via the authority of the DMA 3000, the non-volatile memory controller 4000 and the volatile memory controller 5000 may perform the movement of data.

The non-volatile memory controller 4000 may control the task of reading from or writing onto the non-volatile memory 31. The non-volatile memory controller 4000 may control the non-volatile memory 31 via the first non-volatile memory interface 40.

The volatile memory controller 5000 may control the task of reading from or writing onto the volatile memory 32. Moreover, the volatile memory controller 5000 may perform a refresh task of the volatile memory 32. The volatile memory controller 5000 may control the non-volatile memory 31 via the first volatile memory interface 50.

The global interconnection 5000 may connect the at least one neural processor 1000, the shared memory 2000, the DMA 3000, the non-volatile memory controller 4000, and the volatile memory controller 5000 to one another. In addition, the external interface 3 may also be connected to the global interconnection 5000. The global interconnection 5000 may be a path through which data travels between the at least one neural processor 1000, the shared memory 2000, the DMA 3000, the non-volatile memory controller 4000, the volatile memory controller 5000, and the external interface 3.

The global interconnection 5000 may transmit not only data but also control signals and may transmit a signal for synchronization. That is, in the neural processing device in accordance with some embodiments of the present inventive concept, each neural processor 1000 may directly transmit and receive a synchronization signal, instead of a separate control processor managing the synchronization signal. Accordingly, it is possible to preclude the latency of the synchronization signal generated by the control processor.

In other words, if there exist neural processors 1000 in plurality, there may be dependencies of individual tasks in which the task of one neural processor 1000 needs to be finished before the next neural processor 1000 can start a new task. The end and start of these individual tasks can be checked via a synchronization signal, and in prior art techniques, a control processor performed the reception of such a synchronization signal and an instruction to start a new task.

However, as the number of neural processors 1000 increases and task dependencies are designed more complicatedly, the number of requests and instructions for this synchronization task has increased exponentially. Accordingly, the latency resulting from each request and instruction can greatly reduce the efficiency of tasks.

Accordingly, in the neural processing device in accordance with some embodiments of the present inventive concept, each neural processor 1000, instead of the control processor, may directly transmit a synchronization signal to another neural processor 1000 according to the dependency of a task. In this case, multiple neural processors 1000 can perform the synchronization tasks in parallel as compared with the method managed by the control processor, thereby minimizing the latency due to synchronization.

Furthermore, the control processor needs to perform the task scheduling of the neural processors 1000 according to a task dependency, and the overhead of such scheduling may also increase significantly as the number of neural processors 1000 increases. Therefore, in the neural processing device in accordance with some embodiments of the present inventive concept, the scheduling task is also performed by the individual neural processors 1000, and thus, the performance of the device can be improved without even a scheduling burden resulting therefrom.

Figure 4:
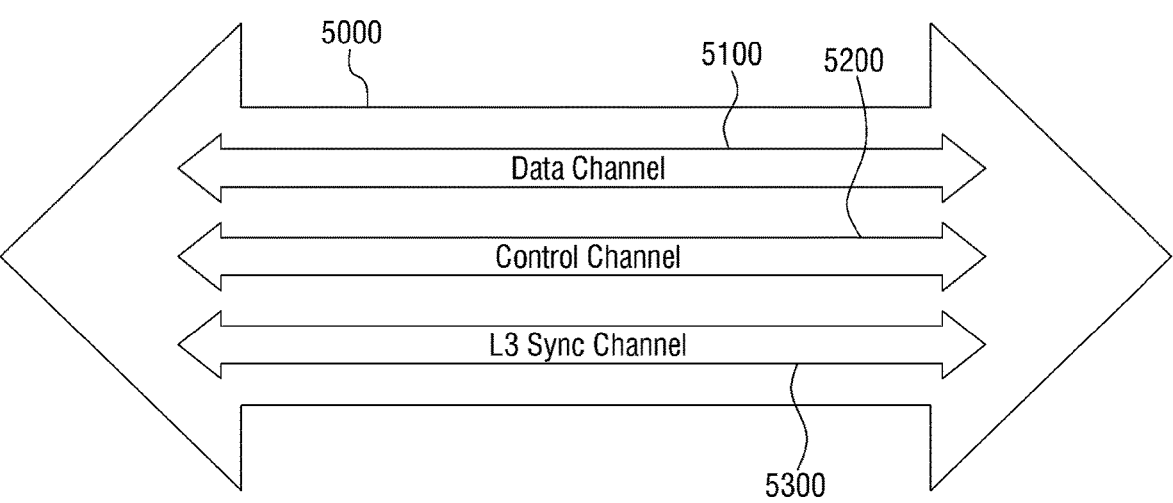
FIG. 4 is a structural diagram for illustrating in detail the global interconnection of FIG. 3.

FIG. 4 is a structural diagram for illustrating in detail the global interconnection of FIG. 3.

Referring to FIG. 4, the global interconnection 5000 may include a data channel 5100, a control channel 5200, and an L3 sync channel 5300.

The data channel 5100 may be a dedicated channel for transmitting data. Through the data channel 5100, the at least one neural processor 1000, the shared memory 2000, the DMA 3000, the non-volatile memory controller 4000, the volatile memory controller 5000, and the external interface 3 may exchange data with one another.

The control channel 5200 may be a dedicated channel for transmitting control signals. Through the control channel 5200, the at least one neural processor 1000, the shared memory 2000, the DMA 3000, the non-volatile memory controller 4000, the volatile memory controller 5000, and the external interface 3 may exchange control signals with one another.

The L3 sync channel 5300 may be a dedicated channel for transmitting synchronization signals. Through the L3 sync channel 5300, the at least one neural processor 1000, the shared memory 2000, the DMA 3000, the non-volatile memory controller 4000, the volatile memory controller 5000, and the external interface 3 may exchange synchronization signals with one another.

The L3 sync channel 5300 may be set as a dedicated channel inside the global interconnection 5000, and thus, may not overlap with other channels and transmit synchronization signals quickly. Accordingly, the neural processing device in accordance with some embodiments of the present inventive concept does not require new wiring work and may smoothly perform the synchronization task by utilizing the conventionally used global interconnection 5000.

Figure 5:
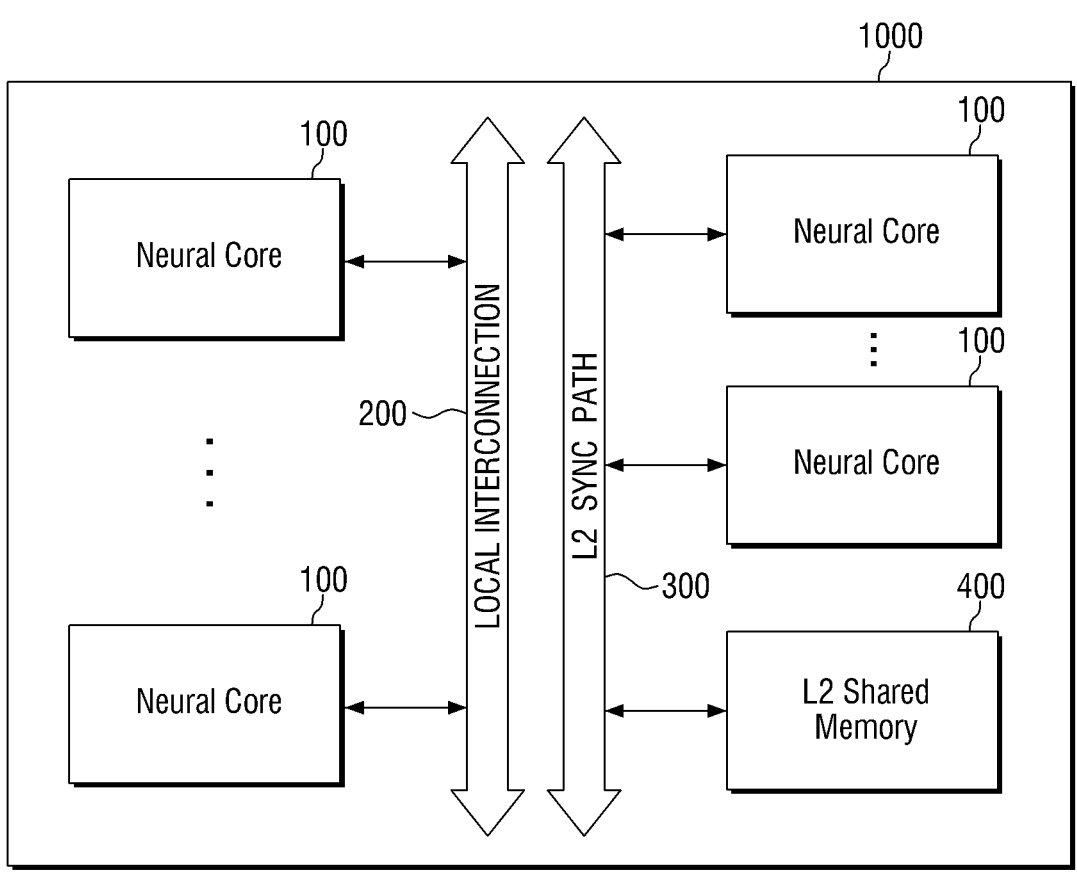
FIG. 5 is a block diagram for illustrating in detail the neural processor of FIG. 3.

FIG. 5 is a block diagram for illustrating in detail the neural processor of FIG. 3.

Referring to FIG. 3 to FIG. 5, the neural processor 1000 may include at least one neural core 100, an L2 shared memory 400, a local interconnection 200, and an L2 sync path 300.

The at least one neural core 100 may share and perform the tasks of the neural processor 1000. The number of neural cores 100 may be, for example, eight. However, the present embodiment is not limited thereto. FIG. 3 and FIG. 5 illustrate that a plurality of neural cores 100 are included in the neural processor 1000, but the present embodiment is not limited thereto. That is, the neural processor 1000 may be configured with only one neural core 100.

The L2 shared memory 400 may be a memory shared by the respective neural cores 100 in the neural processor 1000. The L2 shared memory 400 may store data of each neural core 100. In addition, the L2 shared memory 400 may receive data from the shared memory 2000 of FIG. 4, store them temporarily, and transmit them to each neural core 100. On the contrary, the L2 shared memory 400 may also receive data from the neural core 100, store them temporarily, and transfer them to the shared memory 2000 of FIG. 3.

The L2 shared memory 400 may be a memory corresponding to the neural processor level, i.e., level 2 (L2). The L3 shared memory, i.e., the shared memory 2000 may be shared by the neural processors 1000, and the L2 shared memory 400 may be shared by the neural cores 100.

The local interconnection 200 may connect the at least one neural core 100 and the L2 shared memory 400 to each other. The local interconnection 200 may be a path through which data travels between the at least one neural core 100 and the L2 shared memory 400. The local interconnection 200 may be connected and transmit data to the global interconnection 5000 of FIG. 3.

The L2 sync path 300 may connect the at least one neural core 100 and the L2 shared memory 400 to each other. The L2 sync path 300 may be a path through which synchronization signals of the at least one neural core 100 and the L2 shared memory 400 travel.

The L2 sync path 300 may be formed physically separately from the local interconnection 200. In the case of the local interconnection 200, sufficient channels may not be formed therein, unlike the global interconnection 5000. In such a case, the L2 sync path 300 may be formed separately so that the synchronization signal can be transmitted quickly and without any delay. The L2 sync path 300 may be used for synchronization performed at a level one step lower than that of the L3 sync channel 5300 of the global interconnection 5000.

Figure 6:
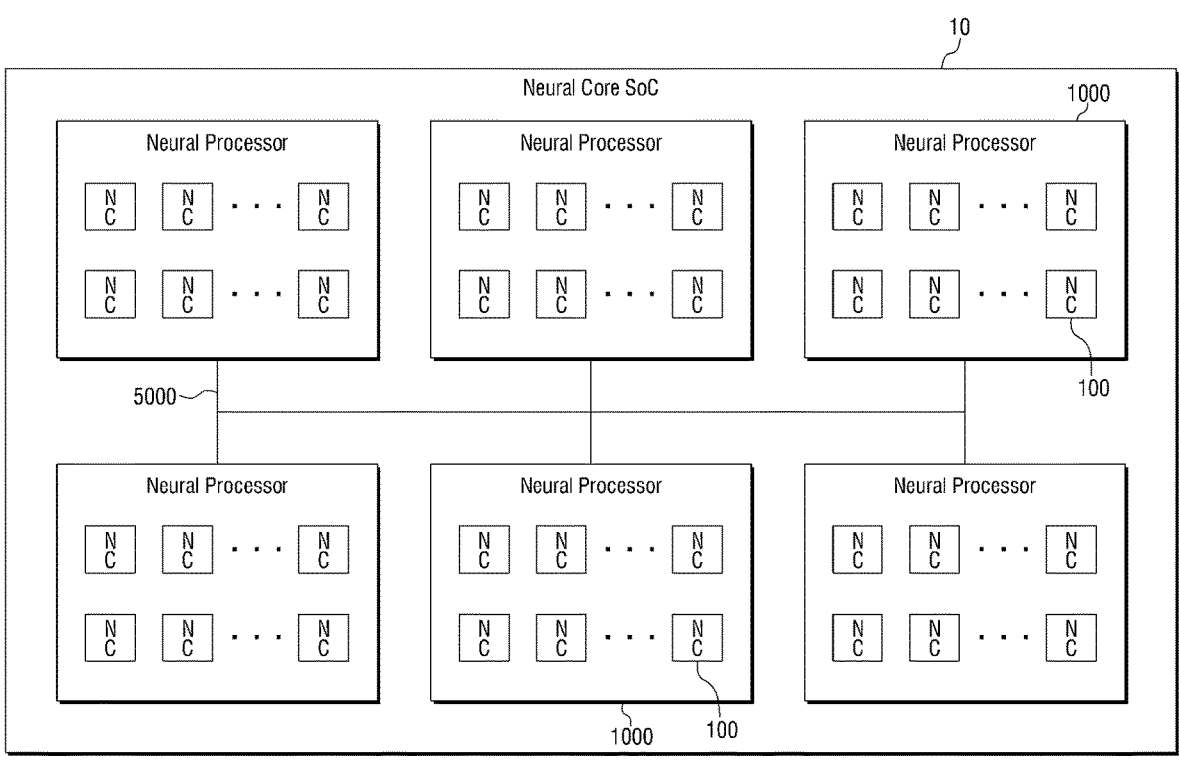
FIG. 6 is a diagram for illustrating a hierarchical structure of a neural processing device in accordance with some embodiments of the present inventive concept.

FIG. 6 is a diagram for illustrating a hierarchical structure of a neural processing device in accordance with some embodiments of the present inventive concept.

Referring to FIG. 6, the neural core SoC 10 may include at least one neural processor 1000. Each neural processor 1000 may transmit data to each other via the global interconnection 5000.

The neural processors 1000 may each include at least one neural core 100. The neural core 100 may be a processing unit optimized for deep learning calculation tasks. The neural core 100 may be a processing unit corresponding to one operation of a deep learning calculation task. In other words, a deep learning calculation task can be represented by a sequential or parallel combination of multiple operations. The neural cores 100 may each be a processing unit capable of processing one operation, and may be a minimum calculation unit that can be considered for scheduling from the viewpoint of a compiler.

The neural processing device in accordance with the present embodiment may configure the scales of the minimum calculation unit considered from the viewpoint of compiler scheduling and the hardware processing unit to be the same, so that fast and efficient scheduling and calculation tasks can be performed.

That is, if the processing units into which hardware can be divided are too large compared to calculation tasks, inefficiency of the calculation tasks may occur in driving the processing units. Conversely, it is not appropriate to schedule a processing unit that is a unit smaller than an operation, which is the minimum scheduling unit of the compiler, every time, since scheduling inefficiency may occur and hardware design cost may increase.

Therefore, in the present embodiment, by adjusting the scales of the scheduling unit of the compiler and the hardware processing unit to be similar, it is possible to simultaneously satisfy the fast scheduling of calculation tasks and the efficient execution of the calculation tasks without wasting hardware resources.

Figure 7:
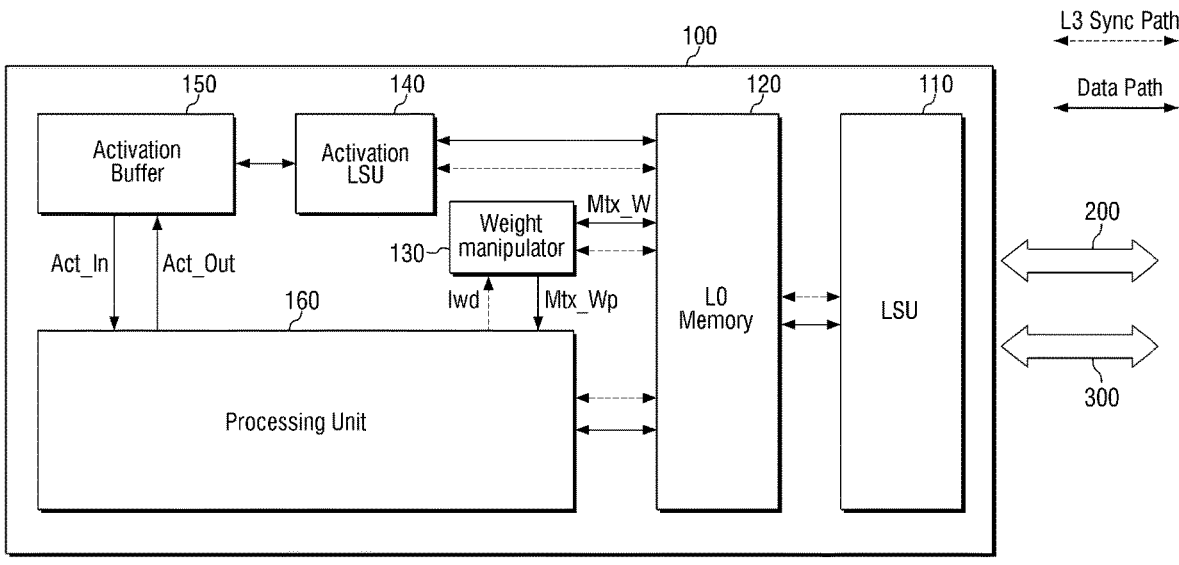
FIG. 7 is a block diagram for illustrating in detail the neural core of FIG. 5.

FIG. 7 is a block diagram for illustrating in detail the neural core of FIG. 5.

Referring to FIG. 7, the neural core 100 may include a load/store unit (LSU) 110, an L0 memory 120, a first weight manipulator 130, an activation LSU 140, an activation buffer 150, and a processing unit 160.

The LSU 110 may receive at least one of data, a control signal, and a synchronization signal from the outside via the local interconnection 200 and the L2 sync path 300. The LSU 110 may transmit at least one of the data, the control signal, and the synchronization signal received to the L0 memory 120. Similarly, the LSU 110 may transfer at least one of the data, the control signal, and the synchronization signal to the outside via the local interconnection 200 and the L2 sync path 300.

Figure 8:
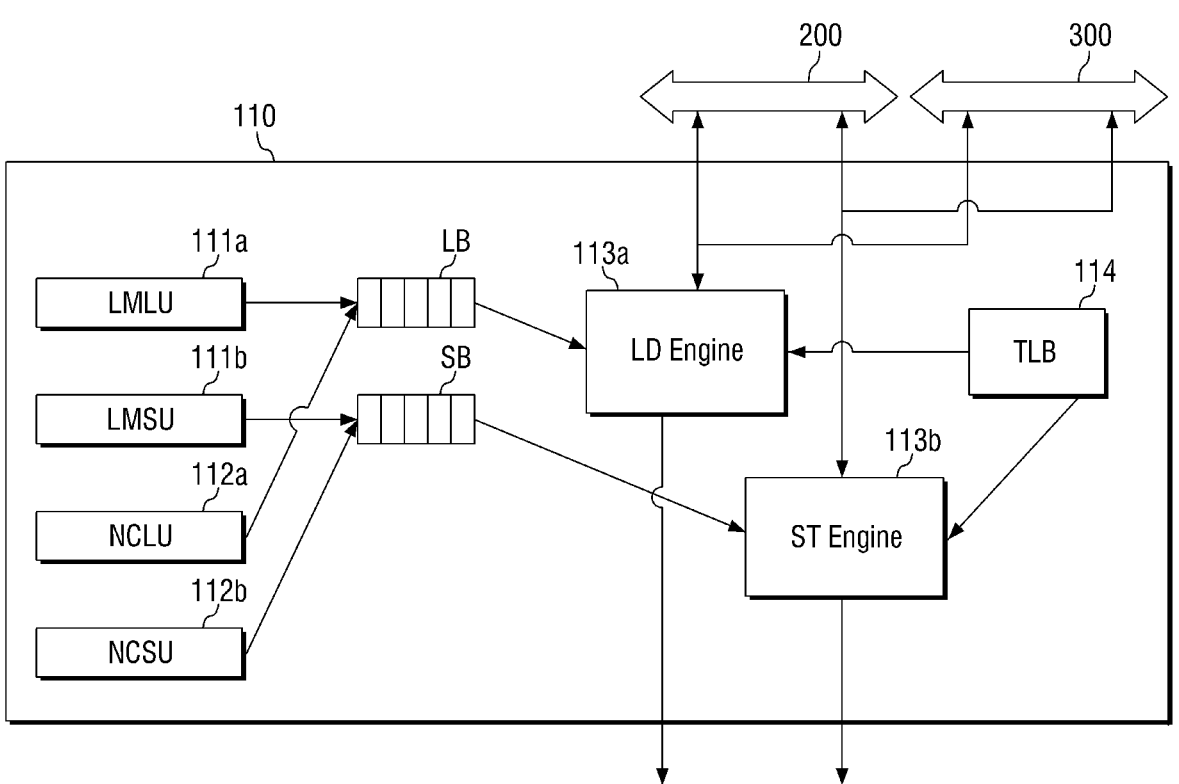
FIG. 8 is a block diagram for illustrating in detail the LSU of FIG. 7.

FIG. 8 is a block diagram for illustrating in detail the LSU of FIG. 7.

Referring to FIG. 8, the LSU 110 may include a local memory load unit 111a, a local memory store unit 111b, a neural core load unit 112a, a neural core store unit 112b, a load buffer LB, a store buffer SB, a load engine 113a, a store engine 113b, and a translation lookaside buffer 114.

The local memory load unit 111a may fetch a load instruction for the L0 memory 120 and issue the load instruction. When the local memory load unit 111a provides the issued load instruction to the load buffer LB, the load buffer LB may sequentially transmit memory access requests to the load engine 113a according to the inputted order.

Further, the local memory store unit 111b may fetch a store instruction for the L0 memory 120 and issue the store instruction. When the local memory store unit 111b provides the issued store instruction to the store buffer SB, the store buffer SB may sequentially transmit memory access requests to the store engine 113b according to the inputted order.

The neural core load unit 112a may fetch a load instruction for the neural core 100 and issue the load instruction. When the neural core load unit 112a provides the issued load instruction to the load buffer LB, the load buffer LB may sequentially transmit memory access requests to the load engine 113a according to the inputted order.

Also, the neural core store unit 112b may fetch a store instruction for the neural core 100 and issue the store instruction. When the neural core store unit 112b provides the issued store instruction to the store buffer SB, the store buffer SB may sequentially transmit memory access requests to the store engine 113b according to the inputted order.

The load engine 113a may receive the memory access request and retrieve data via the local interconnection 200. At this time, the load engine 113a may quickly find the data by using a translation table of a physical address and a virtual address that has been used recently in the translation lookaside buffer 114. If the virtual address of the load engine 113a is not in the translation lookaside buffer 114, the address translation information may be found in another memory.

The store engine 113b may receive the memory access request and retrieve data via the local interconnection 200. At this time, the store engine 113b may quickly find the data by using a translation table of a physical address and a virtual address that has been used recently in the translation lookaside buffer 114. If the virtual address of the store engine 113b is not in the translation lookaside buffer 114, the address translation information may be found in another memory.

The load engine 113a and the store engine 113b may send synchronization signals to the L2 sync path 300. At this time, the synchronization signals may have a meaning that the task has been completed.

Referring to FIG. 7 again, the L0 memory 120 is a memory located inside the neural core 100, and may receive all input data required for the tasks by the neural core 100 from the outside and store them temporarily. In addition, the L0 memory 120 may temporarily store the output data calculated by the neural core 100 for transmission to the outside. The L0 memory 120 may serve as a cache memory of the neural core 100.

The L0 memory 120 may transmit an input activation Act_In to the activation buffer 150 and receive an output activation Act_Out via the activation LSU 140. The L0 memory 120 may directly transmit and receive data to and from the processing unit 160, in addition to the activation LSU 140. In other words, the L0 memory 120 may exchange data with each of a PE array 163 and a vector unit 164.

The L0 memory 120 may be a memory corresponding to the neural core level. The L1 memory may not be shared but be a private memory of the neural core, unlike the L2 shared memory 400 and the shared memory 2000.

The L0 memory 120 may transmit data such as activations or weights via a data path. The L0 memory 120 may exchange synchronization signals via an L1 sync path, which is a separate dedicated path. The L0 memory 120 may exchange synchronization signals with, for example, the LSU 110, the first weight manipulator 130, the activation LSU 140, and the processing unit 160 via the L1 sync path.

The first weight manipulator 130 may receive a two-dimensional weight matrix Mtx_W, containing pruning matrices Mtx_Wp as elements, from the L0 memory 120. The first weight manipulator 130 may perform a pruning task on the two-dimensional weight matrix Mtx_W and thereby generate the pruning matrix Mtx_Wp. The first weight manipulator 130 may transmit the pruning matrix Mtx_Wp to the processing unit 160.

In this case, the first weight manipulator 130 may be a module implemented in hardware or a module logically implemented in software. If the first weight manipulator 130 is a logically implemented module, pruning may be performed by the processing unit 160 or another external calculation module. However, the present embodiment is not limited thereto.

The input activation Act_In and the output activation Act_Out may refer to input values and output values of the layers of a neural network. In this case, if there are a plurality of layers in the neural network, the output value of the previous layer becomes the input value of the next layer, and thus, the output activation Act_Out of the previous layer may be utilized as the input activation Act_In of the next layer.

The weights, which are elements of the two-dimensional weight matrix Mtx_W, may refer to parameters that are multiplied by the input activation Act_In inputted in each layer. The weights are adjusted and confirmed in the deep learning training stage, and may be used to derive the output activation Act_Out via a fixed value in the inference stage.

The activation LSU 140 may transmit the input activation Act_In from the L0 memory 120 to the activation buffer 150, and the output activation Act_Out from the activation buffer 150 to the on-chip buffer. In other words, the activation LSU 140 may perform both a load task and a store task of the activation.

The activation buffer 150 may provide the input activation Act_In to the processing unit 160 and receive the output activation Act_Out from the processing unit 160. The activation buffer 150 may temporarily store the input activation Act_In and the output activation Act_Out.

The activation buffer 150 may quickly provide the activation to the processing unit 160, in particular, the PE array 163, which has a large amount of calculations, and may quickly receive the activation, thereby increasing the calculation speed of the neural core 100.

The processing unit 160 may be a module that performs calculations. The processing unit 160 may perform not only one-dimensional calculations but also two-dimensional matrix calculations, i.e., convolution operations. The processing unit 160 may receive an input activation Act_In, multiply it by a weight, and then add it to generate an output activation Act_Out.

Figure 9:
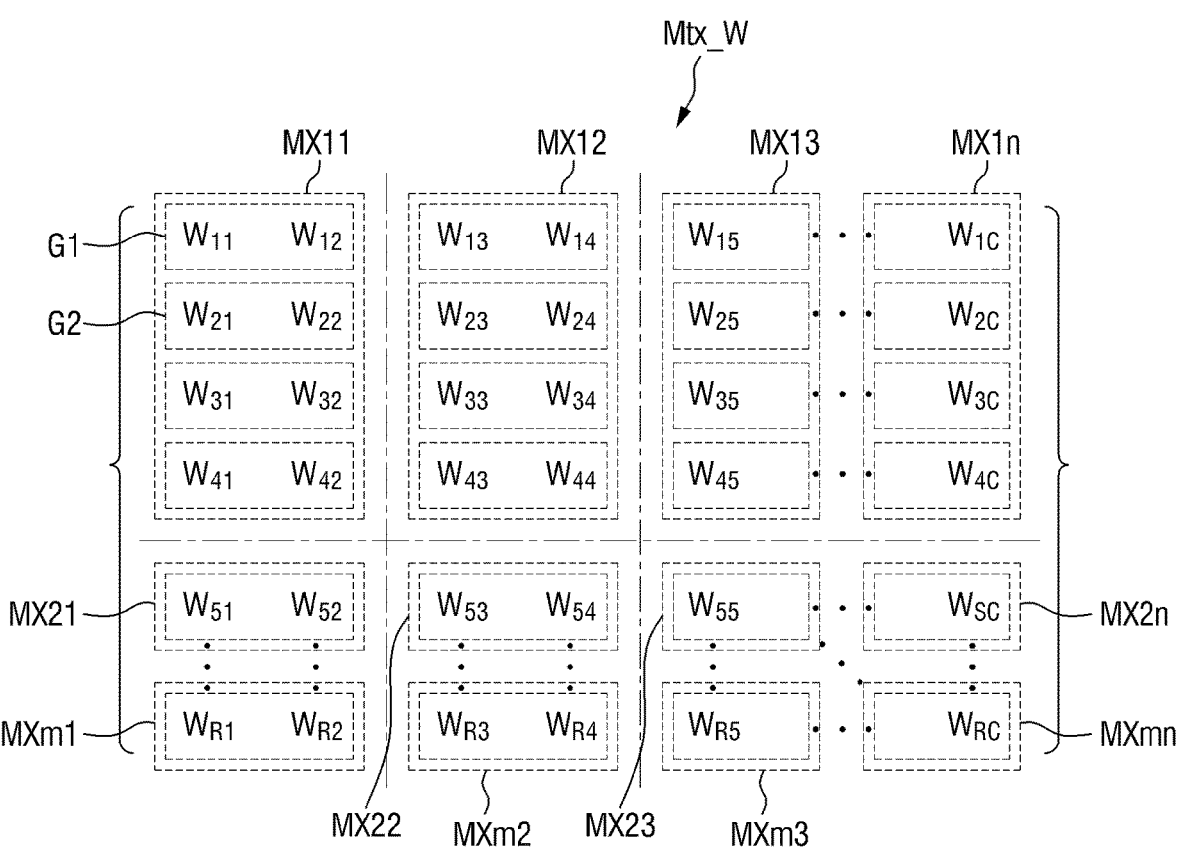
FIG. 9 is an exemplary diagram for illustrating the two-dimensional weight matrix of FIG. 7.

FIG. 9 is an exemplary diagram for illustrating the two-dimensional weight matrix of FIG. 7.

Referring to FIG. 9, the two-dimensional weight matrix Mtx_W may have a plurality of elements. In this case, the elements of the two-dimensional weight matrix Mtx_W may be weights. Deep learning networks consist of multiple layers, each of which may generate an output activation via an input activation and weights. In this case, the input activation may exist in the form of a three-dimensional tensor, and the weight may exist in the form of a four-dimensional tensor.

In order to actually use such a weight in the form of a four-dimensional tensor for calculations, it is necessary to convert it into a two-dimensional weight matrix Mtx_W. That is, the hardware structure of the neural processing device of the present embodiment may receive an input in a two-dimensional form and generate an output.

Accordingly, the two-dimensional weight matrix Mtx_W may be in the form in which elements of a four-dimensional tensor are rearranged in two dimensions. The number of rows in the two-dimensional weight matrix Mtx_W may be equal to the number of input channels, and the number of columns may be equal to the number of output channels.

The two-dimensional weight matrix Mtx_W may include partitioned regions MX11 to MXmn that are later partitioned to become partitioned matrices Mtx_Wg. The partitioned matrices Mtx_Wg may be generated by partitioning the two-dimensional weight matrix Mtx_W into the same size. In this case, the sizes of the partitioned regions MX11 to MXmn may be determined based on the width of the SIMD of the processing element of the neural processing device of the present embodiment.

SIMD (Single Instruction/Multiple Data) may mean that one instruction and multiple data related thereto are inputted to one processing element. The width of the SIMD may refer to the number of data related to one instruction. The width of the SIMD of the processing element of the present embodiment may be, for example, any one of 4, 8, 16, and 32.

Figure 10:
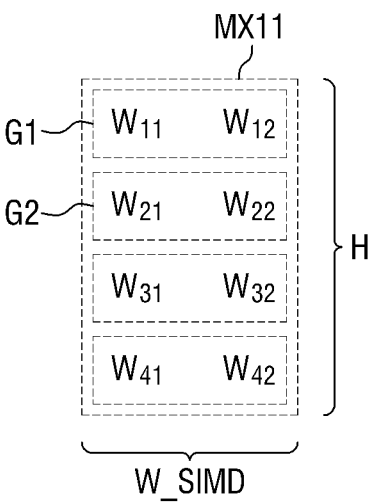
FIG. 10 is an exemplary diagram for illustrating the partitioned region of FIG. 9.

FIG. 10 is an exemplary diagram for illustrating the partitioned region of FIG. 9;

Referring to FIG. 10, the first partitioned region MX11, which is the first one out of the partitioned regions MX11 to MXmn, will be described. However, since the other partitioned regions MX11 to MXmn also have the same form as the first partitioned region MX11, the description of the first partitioned region MX11 will cover the description of the other partitioned regions MX11 to MXmn for convenience.

The first partitioned region MX11 may include at least one row and at least one column. In this case, the number of columns in the first partitioned region MX11 may be equal to the SIMD width W_SIMD of the processing element of the present embodiment. The number of rows in the first partitioned region MX11 is a height H, and may be different from the SIMD width W_SIMD. In this case, the height H may be greater than the SIMD width W_SIMD, but the present embodiment is not limited thereto.

Alternatively, the height H of the first partitioned region MX11 may also be set equal to the SIMD width W_SIMD of the processing element. However, in this case, the number of columns in the first partitioned region MX11 may be different from the SIMD width W_SIMD. That is, at least one of the height H and the number of columns of the first partitioned region MX11 may have to be equal to the SIMD width W_SIMD.

The first partitioned region MX11 may include at least one group. The groups may have the same number of elements as the SIMD width. For example, since the SIMD width is 2 in FIG. 10, a first group G1 and a second group G2 may include two elements. One group may be arranged in one row or one column. However, the present embodiment is not limited thereto.

Figure 11:
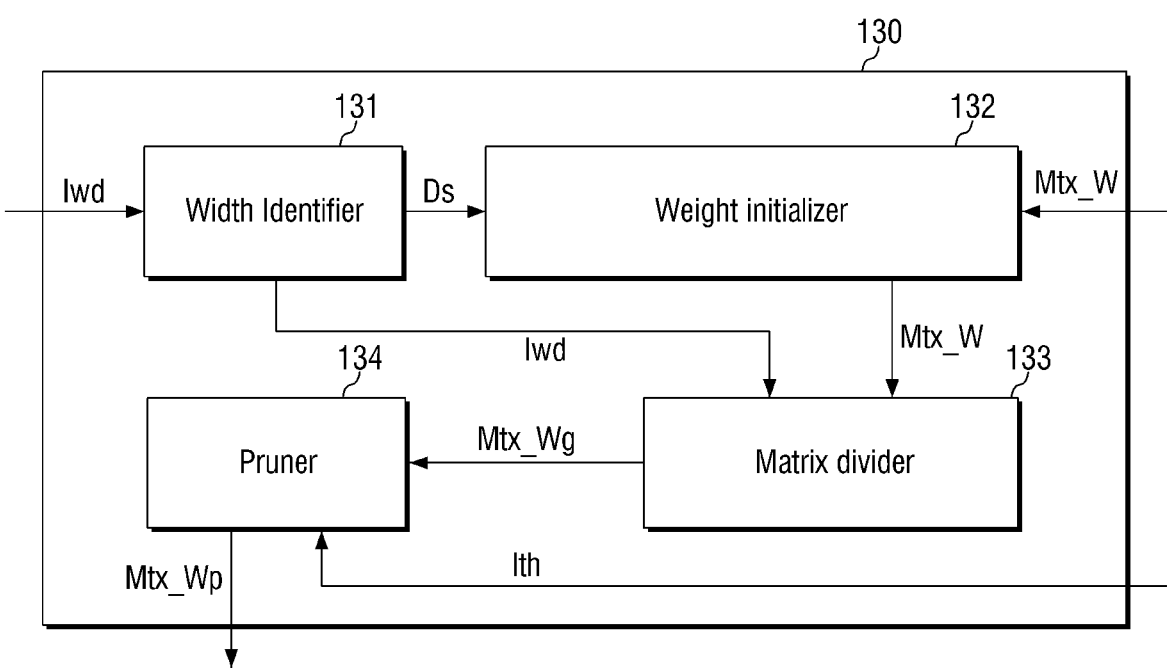
FIG. 11 is a block diagram for illustrating in detail the weight manipulator of FIG. 7.

FIG. 11 is a block diagram for illustrating in detail the weight manipulator of FIG. 7.

Referring to FIG. 11, the first weight manipulator 130 may include a width identifier 131, a weight initializer 132, a matrix divider 133, and a pruner 134.

The width identifier 131 may receive the width information Iwd on the SIMD width of the processing element from the processing unit 160. The width identifier 131 may transmit the width information Iwd to the matrix divider 133. Further, the width identifier 131 may transmit a confirmation signal Ds to the weight initializer 132. At this time, the confirmation signal Ds may be information indicating that the width information Iwd has been received and preparation for weight initialization has been completed. The width identifier 131 may store the width information Iwd after first identifying the SIMD width of the processing element. Accordingly, the width information Iwd can be received only once for the first time. In this case, it is possible to check whether the width information Iwd is stored internally and generate a confirmation signal Ds.

The weight initializer 132 may receive the two-dimensional weight matrix Mtx_W and initialize the weights. Initialization may be performed via the weight initializer 132, or a two-dimensional weight matrix Mtx_W containing pre-initialized values may be received as well. The initialization may use any value or a preset value.

The matrix divider 133 may partition the two-dimensional weight matrix Mtx_W to thereby generate the partitioned matrices Mtx_Wg. At this time, the matrix divider 133 may receive the width information Iwd and determine the size of the partitioned matrices Mtx_Wg. That is, the partitioned matrices Mtx_Wg are of the size of the partitioned regions MX11 to MXmn, and their sizes may be determined according to the SIMD width. As a matter of course, the partitioned matrices Mtx_Wg may be plural.

The pruner 134 may receive a plurality of partitioned matrices Mtx_Wg and perform pruning on them, respectively. The pruner 134 may receive a threshold value Ith. The pruner 134 may perform pruning on the partitioned matrix Mtx_Wg to thereby generate a pruning matrix Mtx_Wp. The pruner 134 may transmit the pruning matrix Mtx_Wp to the processing unit 160.

Figure 12:
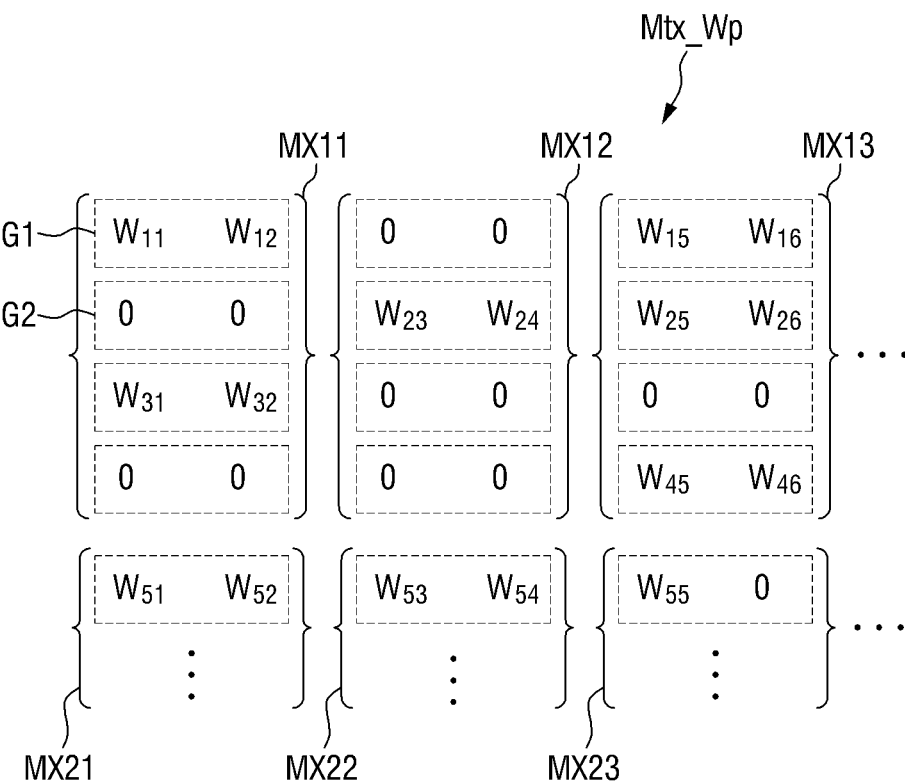
FIG. 12 is an exemplary diagram for illustrating the pruning matrix of FIG. 7.

FIG. 12 is an exemplary diagram for illustrating the pruning matrix of FIG. 7.

Referring to FIGS. 11 and 12, the pruning matrices Mtx_Wp may be plural. The pruning matrix Mtx_Wp may be generated by converting the elements of the partitioned matrix Mtx_Wg. A first pruning matrix Mtx11 may include at least one group as in the first partitioned matrix Mtx_Wg. In FIG. 12, the first pruning matrix Mtx11 may include a first group G1 and a second group G2.

In this case, each group may include the same number of elements as the SIMD width. In FIG. 12, for example, two elements may be included. The pruner 134 may select a representative value of each group. In this case, the representative value may mean a value that can represent the elements of the group. For example, the representative value may include any one of a mean value, a minimum value, a maximum value, a median value, and a root mean square (RMS) value. However, the present embodiment is not limited thereto.

The pruner 134 may compare the representative value of each group with the threshold value Ith. If the representative value is less than the threshold value, the pruner 134 may change all elements of the group corresponding to the representative value to zero (0). Accordingly, the pruning matrix Mtx_Wp may include zero groups in which all elements are zero and non-zero groups in which at least one of the elements is not zero. For example, the first group G1 of FIG. 12 may be a non-zero group, and the second group G2 may be a zero group. The pruner 134 may transmit the pruning matrix Mtx_Wp to the processing unit 160.

Figure 13:
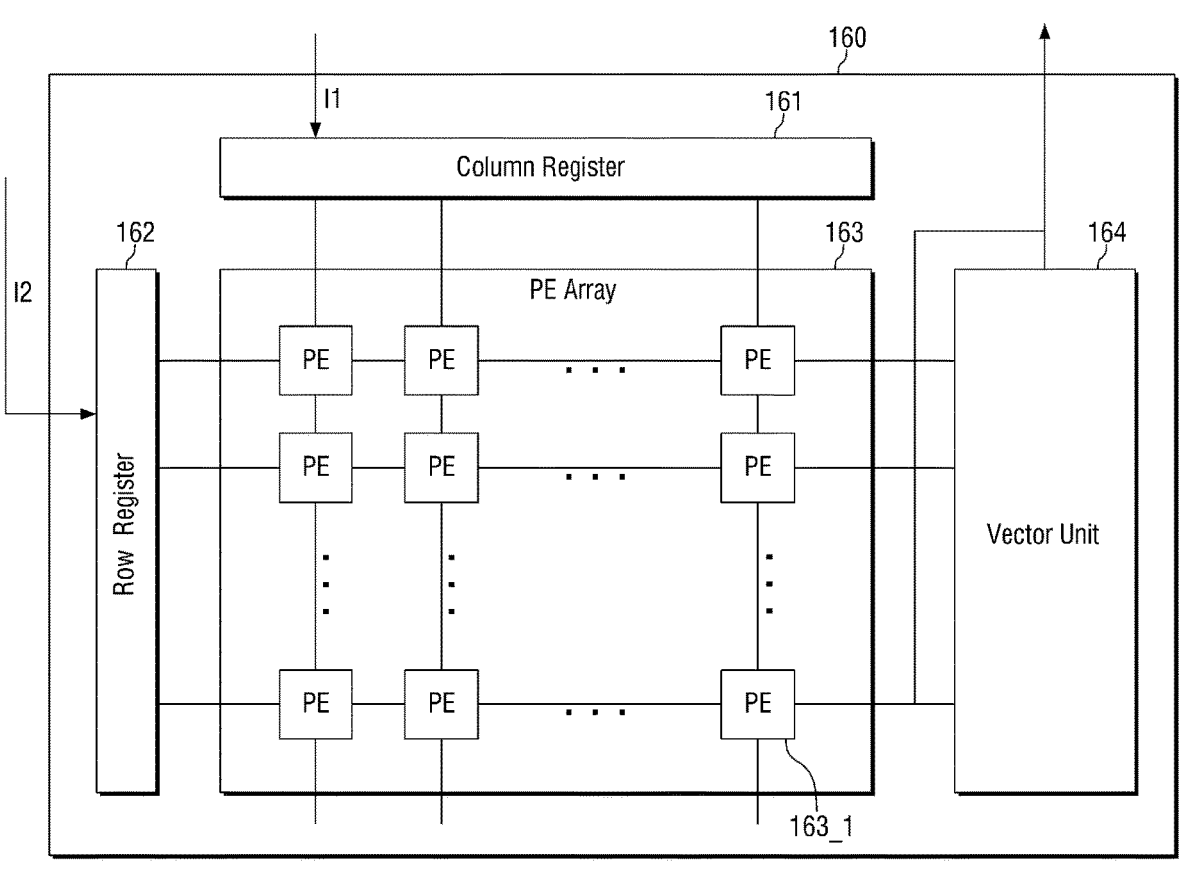
FIG. 13 is a block diagram for illustrating in detail the processing unit of FIG. 7.

FIG. 13 is a block diagram for illustrating in detail the processing unit of FIG. 7.

Referring to FIGS. 7 and 13, the processing unit 160 may include a PE array 163, a vector unit 164, a column register 161, and a row register 162.

The PE array 163 may receive the input activation Act_In and the pruning matrix Mtx_Wp and perform multiplication on them. In this case, the input activation Act_In and the pruning matrix Mtx_Wp may each be in the form of matrices and calculated via convolution. Through this, the PE array 163 may generate an output activation Act_Out. However, the present embodiment is not limited thereto. The PE array 163 may generate any number of other types of outputs other than the output activation Act_Out as well.

The PE array 163 may include at least one processing element PE. The processing elements PE may be aligned with each other and may each perform multiplication on one input activation Act_In and one pruning matrix Mtx_Wp.

The PE array 163 may generate a subtotal obtained by summing values for each multiplication. This subtotal may be utilized as an output activation Act_Out. The PE array 163 performs two-dimensional matrix multiplication, and thus, may be referred to as a 2D matrix compute unit.

The vector unit 164 may perform one-dimensional calculations. The vector unit 164, together with the PE array 163, may perform deep learning calculations. Through this, the processing unit 160 may be specialized for necessary calculations. In other words, the neural core 100 has calculation modules, respectively, that perform a large amount of two-dimensional matrix calculations and one-dimensional calculations, and thus, can efficiently perform deep learning tasks.

The column register 161 may receive a first input I1. The column register 161 may receive the first input I1, divide it, and provide them to each column of the processing element PE.

The row register 162 may receive a second input I2. The row register 162 may receive the second input I2, divide it, and provide them to each row of the processing element PE.

The first input I1 may be the input activation Act_In or the pruning matrix Mtx_Wp. The second input I2 may be a value, which is not the first input I1, out of the input activation Act_In or the pruning matrix Mtx_Wp. Alternatively, the first input I1 and the second input I2 may be values other than the input activation Act_In and the pruning matrix Mtx_Wp.

Figure 14:
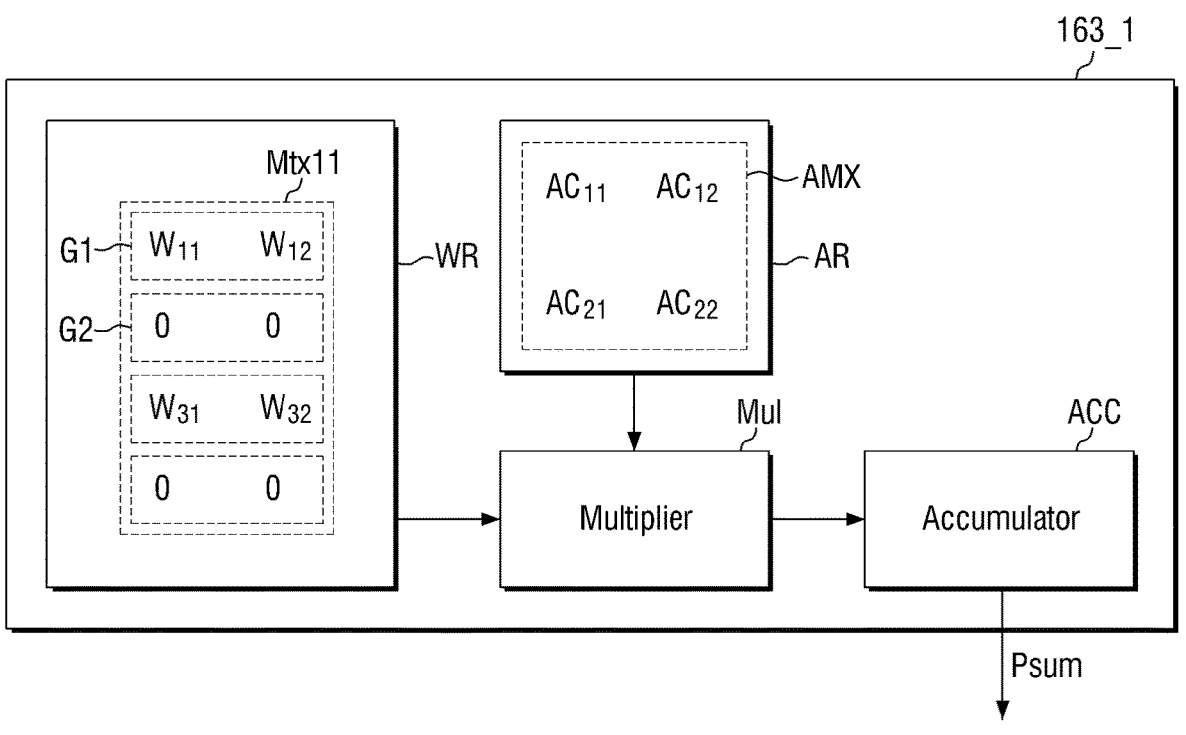
FIG. 14 is a block diagram for illustrating in detail the processing element of FIG. 13.

FIG. 14 is a block diagram for illustrating in detail the processing element of FIG. 13.

Referring to FIGS. 13 and 14, the processing element 163_1 may receive an input in SIMD. In this case, the plurality of processing elements 163_1 may have the same structure as one another. FIG. 14 illustratively shows a processing element 163_1 having a SIMD width of 2.

The processing element 163_1 may include a weight register WR, an input activation register AR, a multiplier Mul, and an accumulator ACC.

The weight register WR may receive and temporarily store the pruning matrix Mtx_Wp. In this case, FIG. 14 shows that a first pruning matrix Mtx11 is inputted by way of an example. The first pruning matrix Mtx11 inputted to the weight register WR may include at least one group. In this case, the at least one group may include non-zero groups and zero groups. For example, the first group G1 may be a non-zero group, and the second group G2 may be a zero group in FIG. 14. The first pruning matrix Mtx11 may include two zero groups and two non-zero groups by way of an example.

The input activation register AR may receive an activation matrix AMX as an input. The activation matrix AMX may refer to data in which the input activation Act_In is formed in a matrix form.

The multiplier Mul may multiply the elements of the first pruning matrix Mtx11 with the elements of the activation matrix AMX. The multiplier Mul may include a plurality of multipliers and thus perform multiplication in parallel. Each multiplier may perform a multiplication between the elements of each matrix. The multiplier Mul may transmit the multiplication result to the accumulator ACC.

The multiplier Mul may multiply a row of the first pruning matrix Mtx11 and a column of the activation matrix AMX with each other. In this case, the rows of the first pruning matrix Mtx11 are groups, and if one of the groups is a zero group, the multiplication has a result of 0, so the multiplication may be skipped without having to be performed.

That is, in the present embodiment, the size of the groups may be determined according to the SIMD width, and pruning may proceed for each group to thereby generate zero groups. If there is a zero group, the calculation can be skipped when performing it, and thus, the performance of the device can be improved much more effectively compared to pruning individual elements. That is, if only some, not all, of the elements are pruned in one group, the calculation cannot be skipped. In contrast, the present embodiment may proceed with pruning for each group, so that calculations can be skipped completely for the elements that result in zero (0) by pruning. Therefore, the efficiency of pruning can be maximized. Furthermore, since the size of the groups is the same as the preset SIMD width, the effect of pruning for each group can be more efficient. In other words, it is because since the elements corresponding to the SIMD width can perform one multiplication calculation, the zero group that matches the size makes it possible to skip one multiplication calculation.

The accumulator ACC may receive and accumulate the multiplication results. The accumulator ACC may generate the cumulative result into a subtotal Psum. The accumulator ACC may output the subtotal Psum.

Figure 15:
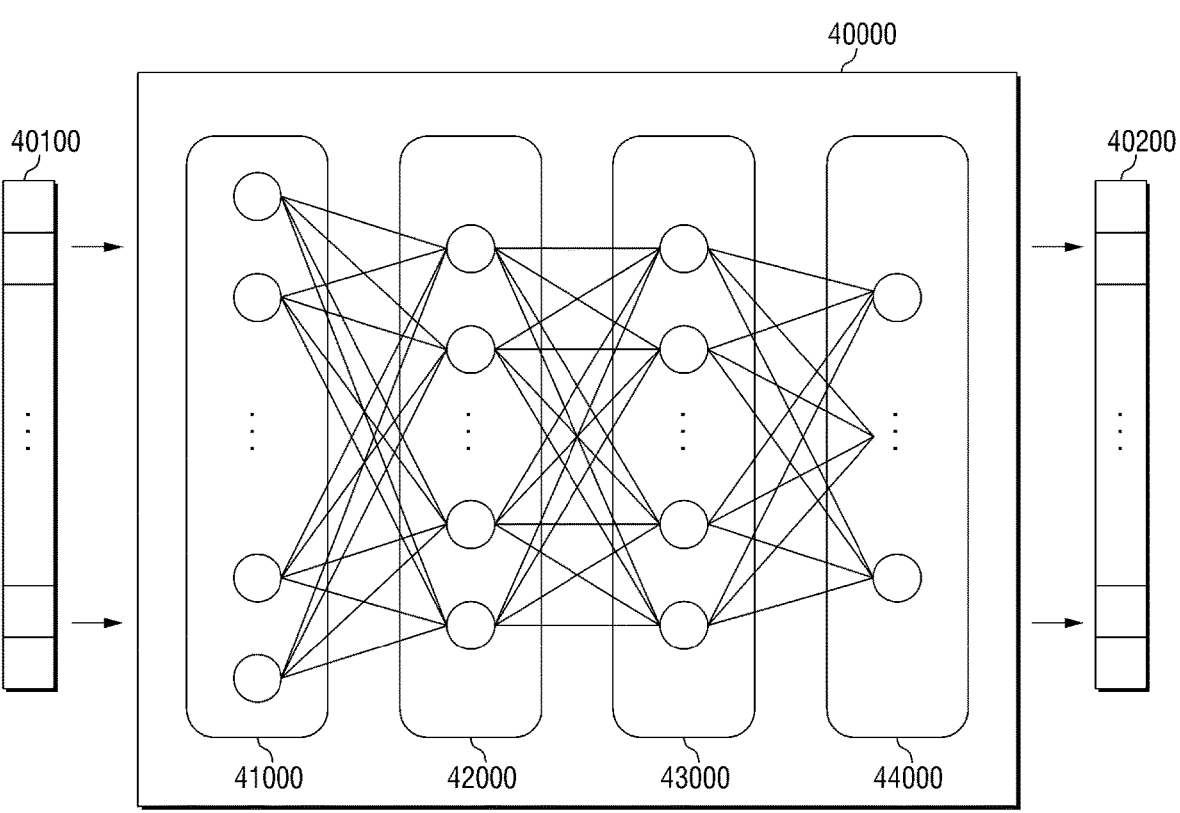
FIG. 15 is a conceptual diagram for illustrating deep learning calculations performed by the neural processing device of FIG. 1.

FIG. 15 is a conceptual diagram for illustrating deep learning calculations performed by a neural processing device in accordance with some embodiments of the present inventive concept.

With reference to FIG. 15, an artificial neural network model 40000 is one example of a machine learning model, and is a statistical learning algorithm implemented based on the structure of a biological neural network or is a structure for executing the algorithm, in machine learning technology and cognitive science.

The artificial neural network model 40000 may represent a machine learning model having an ability to solve problems by learning to reduce the error between an accurate output and an inferred output corresponding to a particular input by repeatedly adjusting the weight of the synapse by nodes, which are artificial neurons that have formed a network by combining synapses, as in a biological neural network. For example, the artificial neural network model 40000 may include any probabilistic model, neural network model, etc., used in artificial intelligence learning methods such as machine learning and deep learning.

A neural processing device in accordance with some embodiments of the present inventive concept may implement the form of such an artificial neural network model 40000 and perform calculations. For example, the artificial neural network model 40000 may receive an input image, and may output information on at least a part of an object included in the input image.

The artificial neural network model 40000 is implemented by a multilayer perceptron (MLP) consisting of multilayer nodes and connections between them. An artificial neural network model 40000 in accordance with the present embodiment may be implemented using one of various artificial neural network model structures including the MLP. As shown in FIG. 15, the artificial neural network model 40000 consists of an input layer 41000 that receives input signals or data 40100 from the outside, an output layer 44000 that outputs output signals or data 40200 corresponding to the input data, and n (where n is a positive integer) hidden layers 42000 to 43000 that are located between the input layer 41000 and the output layer 44000 and that receive a signal from the input layer 41000, extract characteristics, and transmit them to the output layer 44000. Here, the output layer 44000 receives signals from the hidden layers 42000 to 43000 and outputs them to the outside.

The learning methods of the artificial neural network model 40000 include a supervised learning method for training to be optimized to solve a problem by the input of teacher signals (correct answers), and an unsupervised learning method that does not require teacher signals.

The neural processing device may directly generate training data, through simulations, for training the artificial neural network model 40000. In this way, by matching a plurality of input variables and a plurality of output variables corresponding thereto with the input layer 41000 and the output layer 44000 of the artificial neural network model

40000, respectively, and adjusting the synaptic values between the nodes included in the input layer 41000, the hidden layers 42000 to 43000, and the output layer 44000, training may be made to enable a correct output corresponding to a particular input to be extracted. Through such a training phase, it is possible to identify the characteristics hidden in the input variables of the artificial neural network model 40000, and to adjust synaptic values (or weights) between the nodes of the artificial neural network model 40000 so that an error between an output variable calculated based on an input variable and a target output is reduced.

Figure 16:
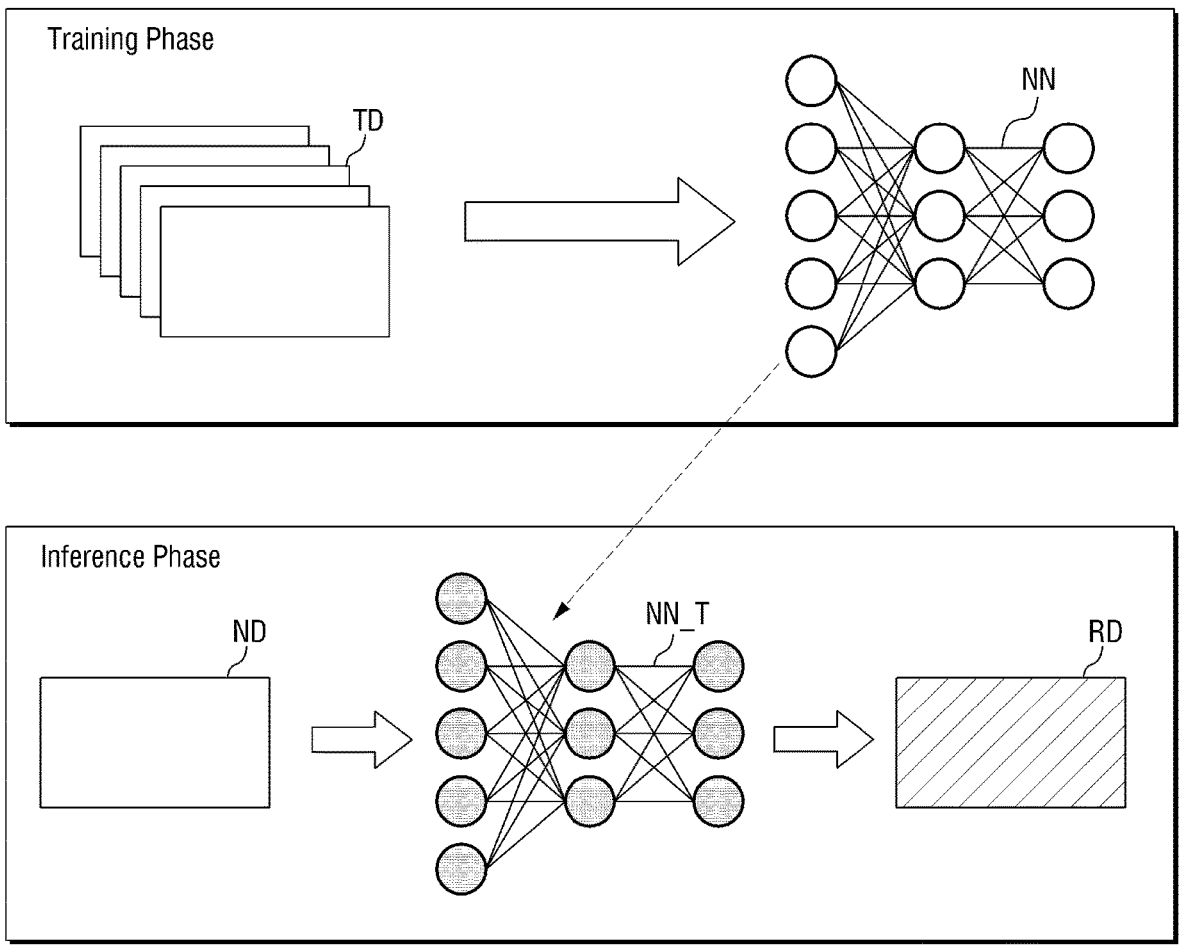
FIG. 16 is a conceptual diagram for illustrating training and inference operations of a neural network of the neural processing device of FIG. 1.

FIG. 16 is a conceptual diagram for illustrating training and inference operations of a neural network of a neural processing device in accordance with some embodiments of the present inventive concept.

Referring to FIG. 16, the training phase may be subjected to a process in which a large number of pieces of training data TD are passed forward to the artificial neural network model NN and are passed backward again. Through this, the weights and biases of each node of the artificial neural network model NN are tuned, and training may be performed so that more and more accurate results can be derived through this. Through the training phase as such, the artificial neural network model NN may be converted into a trained neural network model NN_T.

In the inference phase, new data ND may be inputted into the trained neural network model NN_T again. The trained neural network model NN_T may derive result data RD through the weights and biases that have already been used in the training, with the new data ND as input. For such result data RD, it may be important what training data TD were used in training and how many pieces of training data TD were used, in the training phase.

Referring to FIGS. 11, 15, and 16 again, the threshold value Ith received by the pruner 134 may be trained like a weight. In other words, the neural processing device of the present embodiment propagates the input activation from the training data via the artificial neural network model NN in the training phase. That is, the neural processing device inputs the training data into the input layer 41000, and outputs the output activation via the hidden layers 42000 to 43000 and the output layer 44000. In supervised learning, the neural processing device computes a value of a loss function based on an input activation and a teacher signal. The value of the loss function may be calculated using a mean squared error (MSE) or cross-entropy between the input activation and the teacher signal.

The neural processing device backpropagates the value of the loss function in order to calculate the gradient of the loss function related to the weights of the artificial neural network model NN and the gradient of the loss function related to the threshold value Ith. The backpropagating operation includes an operation of calculating the gradient of the loss function related to the weights of the artificial neural network model NN and the gradient of the loss function related to the threshold value Ith. The backpropagating aims to minimize the value of the loss function by adjusting the weights and threshold values.

The loss function related to the weights means a change in the value of the loss function according to a change in the weights. The loss function related to the threshold value Ith means a change in the value of the loss function according to a change in the threshold value Ith. The neural processing device updates the weights of the neural network model NN and the threshold value Ith according to the gradient of the loss function related to the weights of the artificial neural network model NN and the gradient of the loss function related to the threshold value Ith. According to the update of the threshold value Ith, particular weight groups may all be reset to 0, or the value set to 0 may be cancelled and returned to the original value.

The neural processing device performs structured sparsity regularization on the artificial neural network model NN in order to avoid overfitting of the artificial neural network model NN. Structured sparsity regularization means performing a regularization operation by taking the weight groups into account. The update operation of the threshold values is performed in the process of performing structured sparsity regularization. The optimization target of the structured sparsity regularization may be expressed as the following equation:

$$E(W) = E_D(W, th) + \lambda_G \sum_{n=1}^{N} R_G(W, th)^{(n)}$$

The E(W) may be an optimization target, the th may be a threshold value, the W may be a weight, and the $E_D$(W, th) may be a classification loss. In addition, the $\lambda_G$ may be a penalty term that determines how much penalty is given to the weights belonging to any one group, or a regularization parameter. The $R_G$(W, th)$^{(n)}$ means a structured sparsity regularization term. The N denotes the number of layers in the artificial neural network model NN, and n denotes the sequence of the weight tensor.

The classification loss $E_D$(W, th) is updated to minimize the overall loss. The structured sparsity regularization term $R_G$(W, th)$^{(n)}$ is trained in the direction of minimizing losses. The threshold value th is updated in the direction of increasing the sparsity.

Hereinafter, load balancing will be described with reference to FIGS. 17 and 18.

Figure 17:
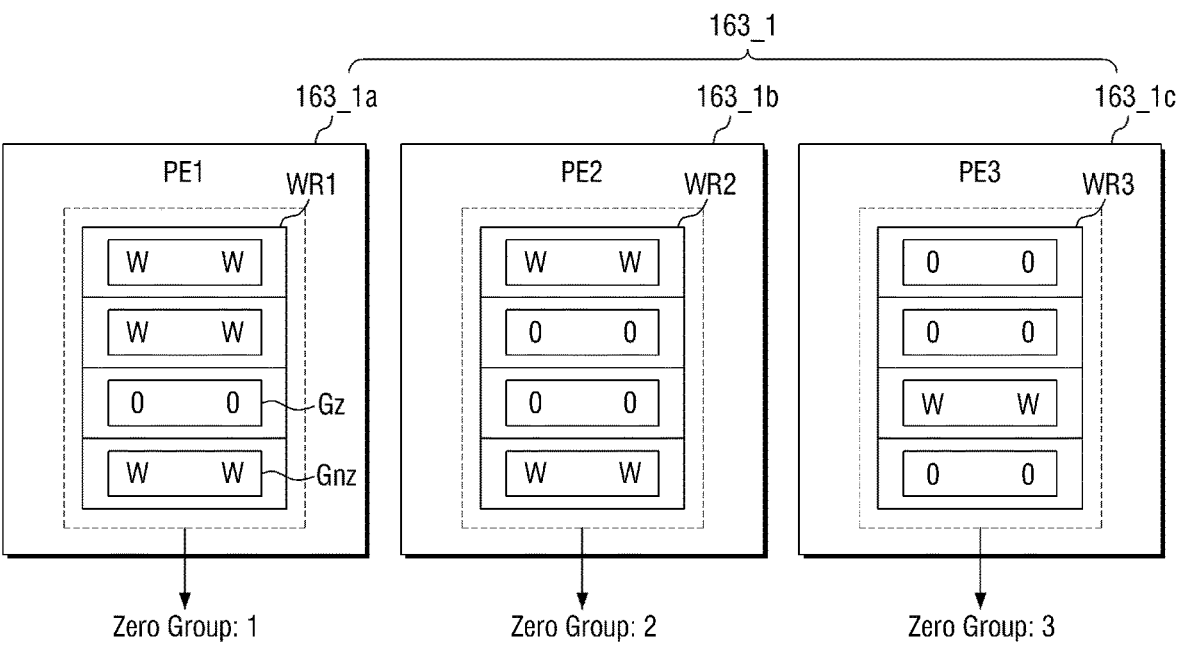
FIG. 17 is an exemplary diagram for illustrating the case where partitioned matrices before load balancing are respectively inputted to processing elements.
Figure 18:
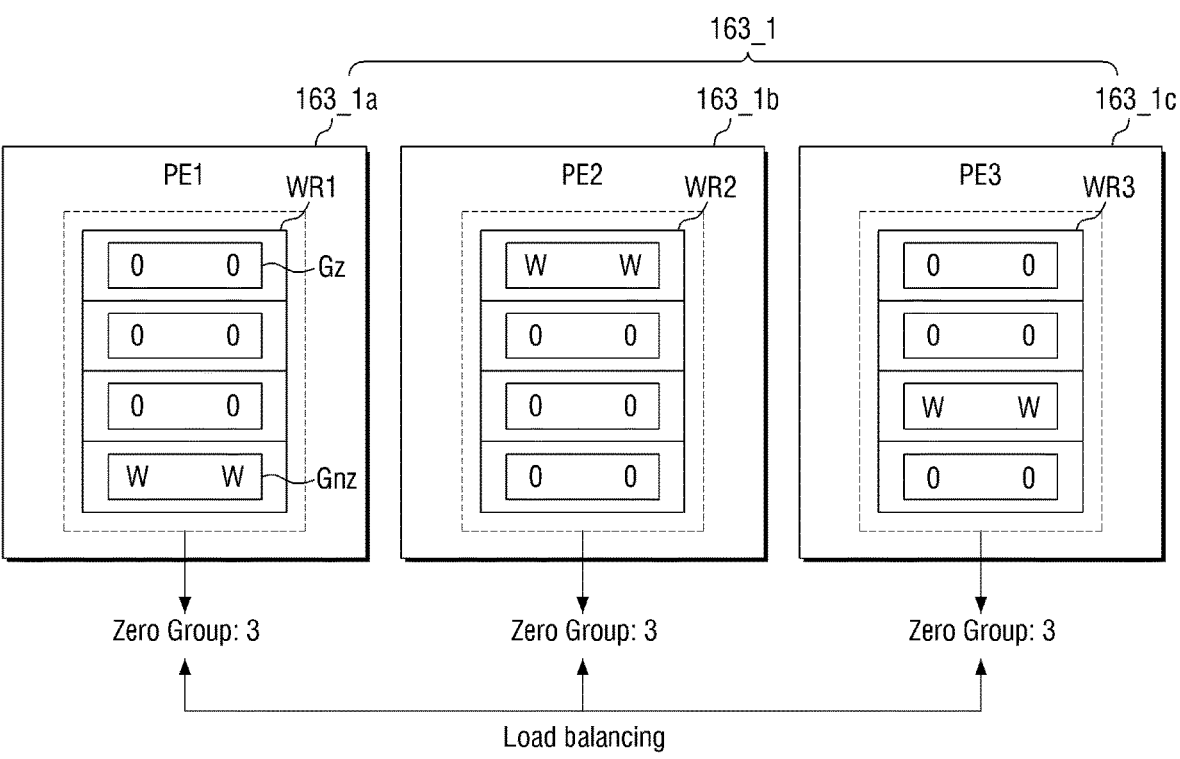
FIG. 18 is an exemplary diagram for illustrating the case where partitioned matrices after load balancing are respectively inputted to processing elements.

FIG. 17 is an exemplary diagram for illustrating the case where partitioned matrices before load balancing are respectively inputted to processing elements, and FIG. 18 is an exemplary diagram for illustrating the case where partitioned matrices after load balancing are respectively inputted to processing elements.

Referring to FIGS. 13, 17, and 18, the first processing element 163_1a, the second processing element 163_1b, and the third processing element 163_1c may include a first weight register WR1, a second weight register WR2, and a third weight register WR3, respectively.

Each of the first weight register WR1, the second weight register WR2, and the third weight register WR3 may receive the partitioned matrix Mtx_Wg, and each partitioned matrix Mtx_Wg may include at least one group. For example, the first weight register WR1 may include one zero group Gz and three non-zero groups Gnz.

The second weight register WR2 may include two zero groups, and the third weight register WR3 may include three zero groups. Each processing element 163_1 may perform calculations in parallel, and accordingly, may add up all subtotals to perform a final calculation.

However, the processing element 163_1 having a relatively large number of zero groups can complete the calculations relatively quickly, whereas the processing element 163_1 having a relatively large number of non-zero groups, that is, a small number of zero groups, may complete the calculations relatively slowly.

However, since the final calculation must be performed using all of the subtotals, the slowest processing element 163_1 may act as an obstacle to speed improvement. In other words, since the processing element 163_1 that has completed the calculations relatively quickly has to wait for the processing element 163_1 that has completed the calculations relatively slowly, the effect of completing the calculations quickly may not be significant.

Therefore, the present embodiment may perform a load balancing task of pruning the number of zero groups Gz provided to each processing element 163_1 to be the same or similar. The load balancing task may be performed by adjusting the threshold value Ith in such a way of increasing the sparsity in the training stage described above. Accordingly, the pruner 134 may perform pruning so that the number of zero groups Gz is uniformly distributed.

Figure 19:
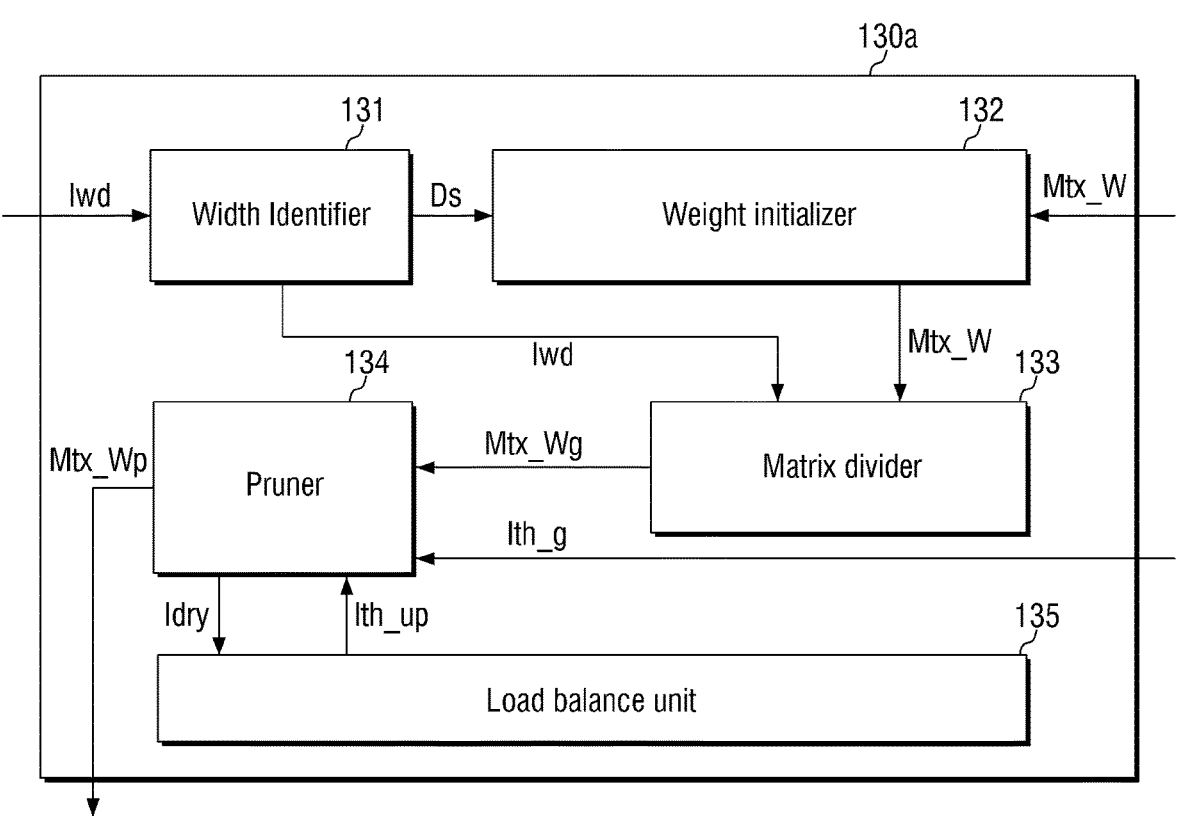
FIG. 19 is a block diagram for illustrating a neural processing device in accordance with some embodiments of the present inventive concept.

FIG. 19 is a block diagram for illustrating a neural processing device in accordance with some embodiments of the present inventive concept.

With reference to FIG. 19, some embodiments of the present inventive concept may include a second weight manipulator 130a. The second weight manipulator 130a may further include a load balance unit 135 in comparison with the first weight manipulator 130.

The pruner 134 may receive an initial threshold value Ith_g and perform a dry run. The dry run may mean performing pruning using the initial threshold value Ith_g prior to the final execution. The pruner 134 may generate the results of executing the dry run into dry run information Idry. The pruner 134 may transmit the dry run information Idry to the load balance unit 135.

The load balance unit 135 may receive the dry run information Idry. The load balance unit 135 may generate an updated threshold value Ith_up via the dry run information Idry. The load balance unit 135 may transmit the updated threshold value Ith_up to the pruner 134.

The pruner 134 may perform pruning using the updated threshold value Ith_up, and may generate the pruning matrix Mtx_Wp through this.

Figure 20:
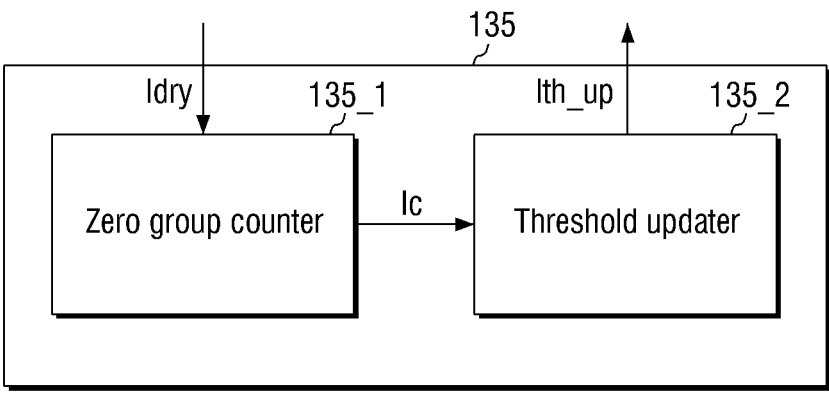
FIG. 20 is a block diagram for illustrating in detail the load balance unit of FIG. 19.

FIG. 20 is a block diagram for illustrating in detail the load balance unit of FIG. 19.

Referring to FIG. 20, the load balance unit 135 may include a zero group counter 135_1 and a threshold updater 135_2.

The zero group counter 1351 may receive the dry run information Idry and check the pruning result according to the dry run. The zero group counter 135_1 may count the number of generated zero groups Gz in the pruning result, thereby generating counting information Ic. The counting information Ic may be information for determining the number of zero groups Gz in each partitioned matrix Mtx_Wg unit.

The threshold updater 1352 may receive the counting information Ic, and update the threshold value accordingly. The threshold updater 135_2 may generate an updated threshold value Ith_up according to the counting information Ic. The threshold updater 135_2 may transmit the updated threshold value Ith_up to the pruner 134. The updated threshold value Ith_up may include a partitioned matrix threshold value corresponding to each partitioned matrix Mtx_Wg. In other words, the updated threshold value Ith_up may vary for each partitioned matrix Mtx_Wg.

Referring to FIGS. 17, 18, and 20, the threshold updater 1352 may select the partitioned matrix Mtx_Wg of the third weight register WR3 having the largest number of zero groups Gz as a reference partitioned matrix according to the counting information Ic.

Since the reference partitioned matrix includes the largest number of zero groups Gz, it may not be necessary to adjust the initial threshold value Ith_g. In other words, since the load balancing task is to reduce the difference between the numbers of zero groups Gz of the reference partitioned matrix Mtx_Wg and the other partitioned matrices Mtx_Wg, it may not be necessary to modify the initial threshold value Ith_g of the reference partitioned matrix. Therefore, the initial threshold value Ith_g of the reference partitioned matrix may remain unchanged during several epochs in the training stage.

Instead, the initial threshold values Ith_g of the remaining partitioned matrices Mtx_Wg other than the reference partitioned matrix, i.e., the partitioned matrices Mtx_Wg of the first weight register WR1 and the second weight register WR2 may be adjusted, thereby newly generating updated threshold values Ith_up.

The operation of selectively updating the weights in the weight registers may be expressed by the following equation:

$$E(W) = E_D(W, th) + \lambda_G \sum_{n=1}^{N} R_G(W, th)^{(n)} + \lambda_B \sum_{c=1}^{C} R_B(Wg, thg)^{(c)}$$

The E(W) may be an optimization target, the th may be a threshold value, the W may be a weight, and the $E_D(W, th)$ may be a classification loss. In addition, the $\lambda_G$ may be a penalty term that determines how much penalty is given to the weights belonging to any one group, or a regularization parameter. The $R_G(W, th)^{(n)}$ means a structured sparsity regularization term. The N denotes the number of layers in the artificial neural network model NN, and n denotes the sequence of the weight tensor.

The $\lambda_B$ denotes a penalty term that determines how much penalty is given to those belonging to a column of any one weight register or regularization parameter, and the $R_B(Wg, thg)^{(c)}$ denotes a regularization term for the weights belonging to a column of any one weight register. The C denotes the number of columns of the weight register, and c denotes the sequence of the columns.

The classification loss $E_D(W, th)$ is updated to minimize the overall loss. The structured sparsity regularization term $R_G(W, th)^{(n)}$ is trained in the direction of minimizing losses. The threshold value th is updated in the direction of increasing the sparsity.

The regularization term $R_B(Wg, thg)^{(c)}$ thy is trained in the direction of minimizing losses. The threshold value thg is updated in the direction of minimizing the difference in the number of zero groups per column of the weight register. In other words, the update of the updated threshold value Ith_up may proceed in the direction of performing load balancing.

Figure 21:
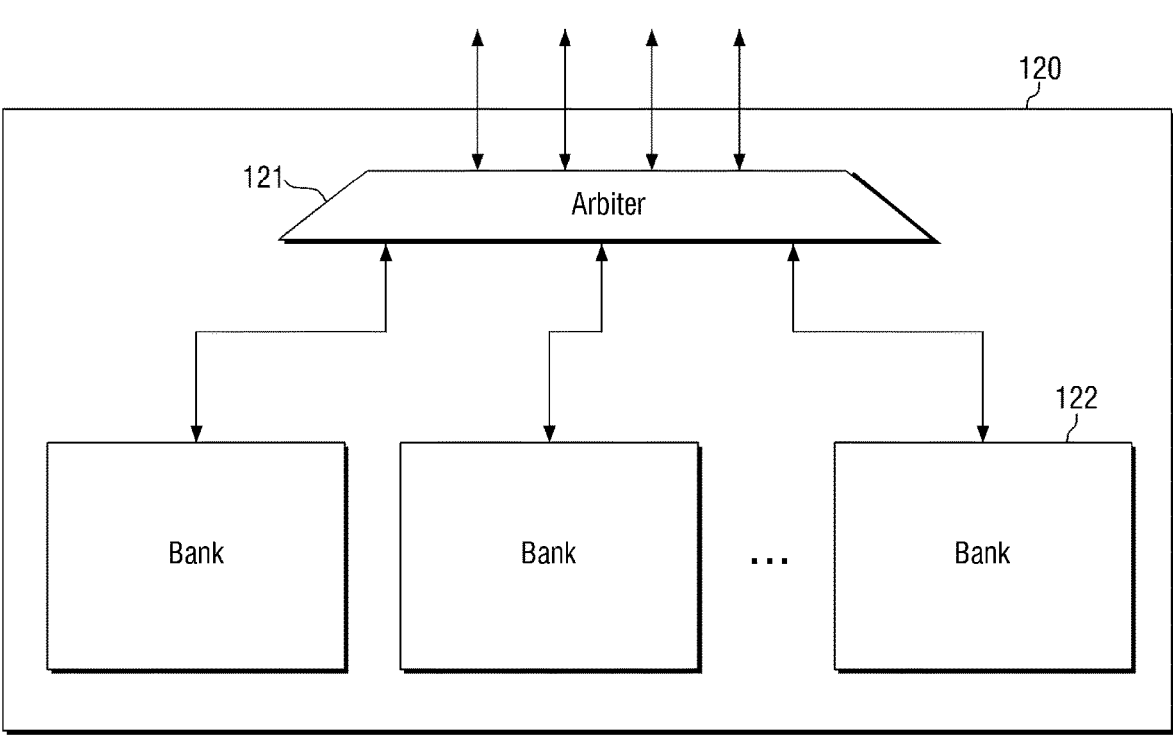
FIG. 21 is a block diagram for illustrating in detail the L0 memory of FIG. 7.

FIG. 21 is a block diagram for illustrating in detail the L0 memory of FIG. 7.

With reference to FIG. 21, the L0 memory 120 may include a scheduler 121 and at least one local memory bank 122.

When data is stored in the L0 memory 120, the scheduler 121 may receive the data from the load engine 113a. At this time, the local memory banks 122 may be allocated to the data in a round robin fashion. Accordingly, the data may be stored in any one of the at least one local memory bank 122.

Conversely, when the data is loaded from the L0 memory 120, the scheduler 121 may receive the data from the local memory bank 122 and transmit them to the store engine 113b. The store engine 113b may store data externally via the local interconnection 200.

Figure 22:
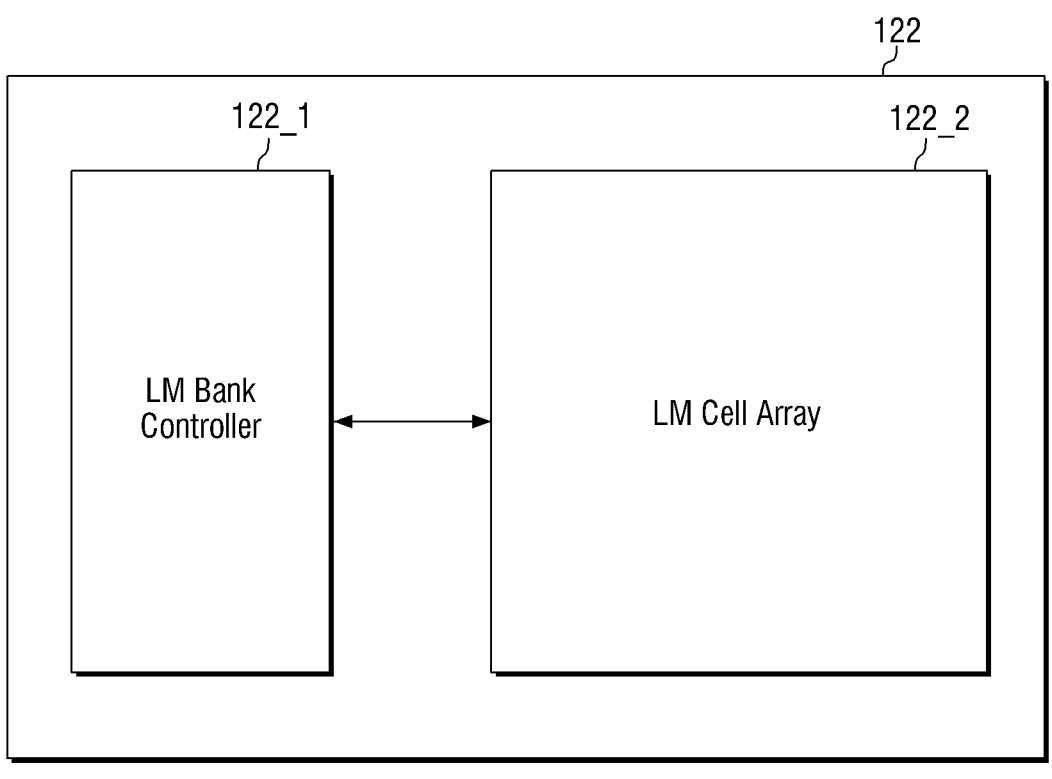
FIG. 22 is a block diagram for illustrating in detail the local memory bank of FIG. 21.

FIG. 22 is a block diagram for illustrating in detail the local memory bank of FIG. 21.

With reference to FIG. 22, the local memory bank 122 may include a local memory bank controller 122_1 and a local memory bank cell array 122_2.

The local memory bank controller 1221 may manage read and write operations via the addresses of data stored in the local memory bank 122. That is, the local memory bank controller 122_1 may manage the input/output of data as a whole.

The local memory bank cell array 1222 may be of a structure in which cells in which data is directly stored are arranged in rows and columns. The local memory bank cell array 1222 may be controlled by the local memory bank controller 122_1.

Figure 23:
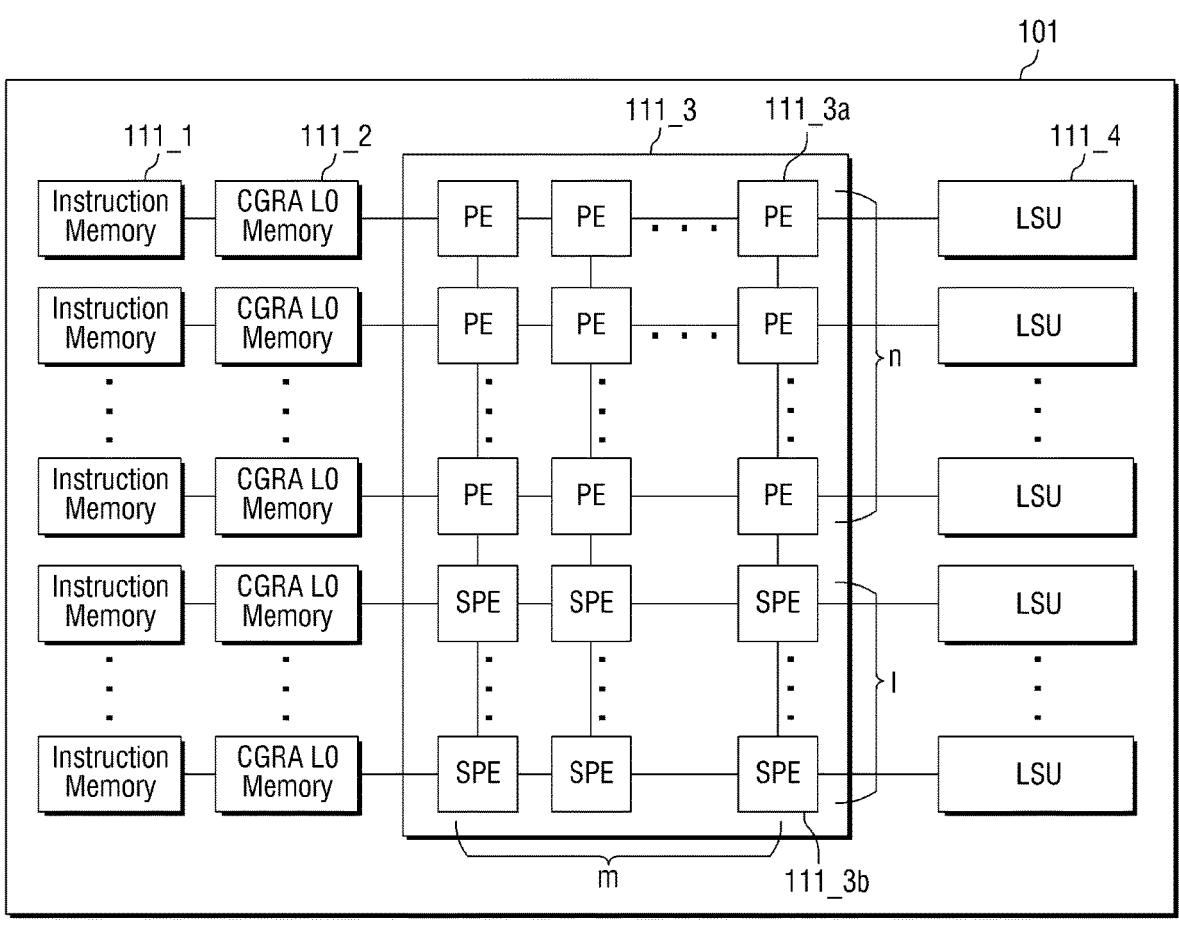
FIG. 23 is a block diagram for illustrating in detail the structure of the neural processing device of FIG. 1.

FIG. 23 is a block diagram for illustrating in detail the structure of a neural processing device in accordance with some embodiments of the present inventive concept.

Referring to FIG. 23, the neural core 101 may be of a CGRA structure, unlike the neural core 100. The neural core 101 may include an instruction memory 111_1, a CGRA L0 memory 111_2, a PE array 111_3, and a load/store unit (LSU) 111_4.

The instruction memory 111_1 may receive and store instructions. The instruction memory 111_1 may sequentially store instructions internally, and provide the stored instructions to the PE array 111_3. In this case, the instructions may instruct the operation of the processing element 111_3a included in each PE array 111_3.

The CGRA L0 memory 111_2 is a memory located inside the neural core 101, and may receive all the input data required for the tasks by the neural core 101 from the outside and temporarily store them. Further, the CGRA L0 memory 111_2 may temporarily store the output data calculated by the neural core 101 in order to transmit them to the outside. The CGRA L0 memory 111_2 may serve as a cache memory of the neural core 101.

The CGRA L0 memory 111_2 may send and receive data to and from the PE array 111_3. The CGRA L0 memory 111_2 may be a memory corresponding to L0 (level 0) lower than L1. In this case, the L0 memory may be a private memory of the neural core 101 that is not shared. The CGRA L0 memory 111_2 may transmit data such as activations or weights, programs, and the like to the PE array 111_3.

The PE array 111_3 may be a module that performs calculations. The PE array 1113 may perform not only one-dimensional calculations but also two-dimensional or higher matrix/tensor calculations. The PE array 1113 may include a plurality of processing elements 111_3a and particular processing elements 111_3b therein.

The processing elements 111_3a and the particular processing elements 111_3b may be arranged in rows and columns. The processing elements 111_3a and the particular processing elements 111_3b may be arranged in m columns. Further, the processing elements 111_3a may be arranged in n rows, and the particular processing elements 111_3b may be arranged in 1 rows. Accordingly, the processing elements 111_3a and the particular processing elements 111_3b may be arranged in (n+1) rows and m columns.

The LSU 111_4 may receive at least one of data, a control signal, and a synchronization signal from the outside via the L1 interconnection 130. The LSU 111_4 may transmit at least one of the received data, control signal, and synchronization signal to the CGRA L0 memory 111_2. Similarly, the LSU 111_4 may transmit at least one of the data, control signal, and synchronization signal to the outside via the L1 interconnection 130.

The neural core 101 may have a CGRA (Coarse Grained Reconfigurable Architecture) structure. Accordingly, in the neural core 101, the respective processing elements 111_3a and particular processing elements 111_3b of the PE array 111_3 may be connected to at least one of the CGRA L0 memory 111_2, the instruction memory 11L_1, and the LSU 111_4, respectively. In other words, the processing elements 111_3a and the particular processing elements 111_3b do not have to be connected to all of the CGRA L0 memory 111_2, the instruction memory 11L_1, and the LSU 111_4, but may be connected to some of them.

Further, the processing elements 111_3a and the particular processing elements 111_3b may be different types of processing elements from each other. Accordingly, out of the CGRA L0 memory 111_2, the instruction memory 11L_1, and the LSU 111_4, the elements connected to the processing elements 111_3a and the elements connected to the particular processing elements 111_3b may be different from each other.

The neural core 101 of the present inventive concept having a CGRA structure enables high-level parallel calculations, and since direct data exchange between the processing elements 111_3a and the particular processing elements 111_3b is possible, the power consumption may be low. In addition, by including two or more types of processing elements 111_3a, optimization according to various calculation tasks may be possible.

For example, if the processing elements 111_3a are processing elements that perform two-dimensional calculations, the particular processing elements 111_3b may be processing elements that perform one-dimensional calculations. However, the present embodiment is not limited thereto.

Figure 24:
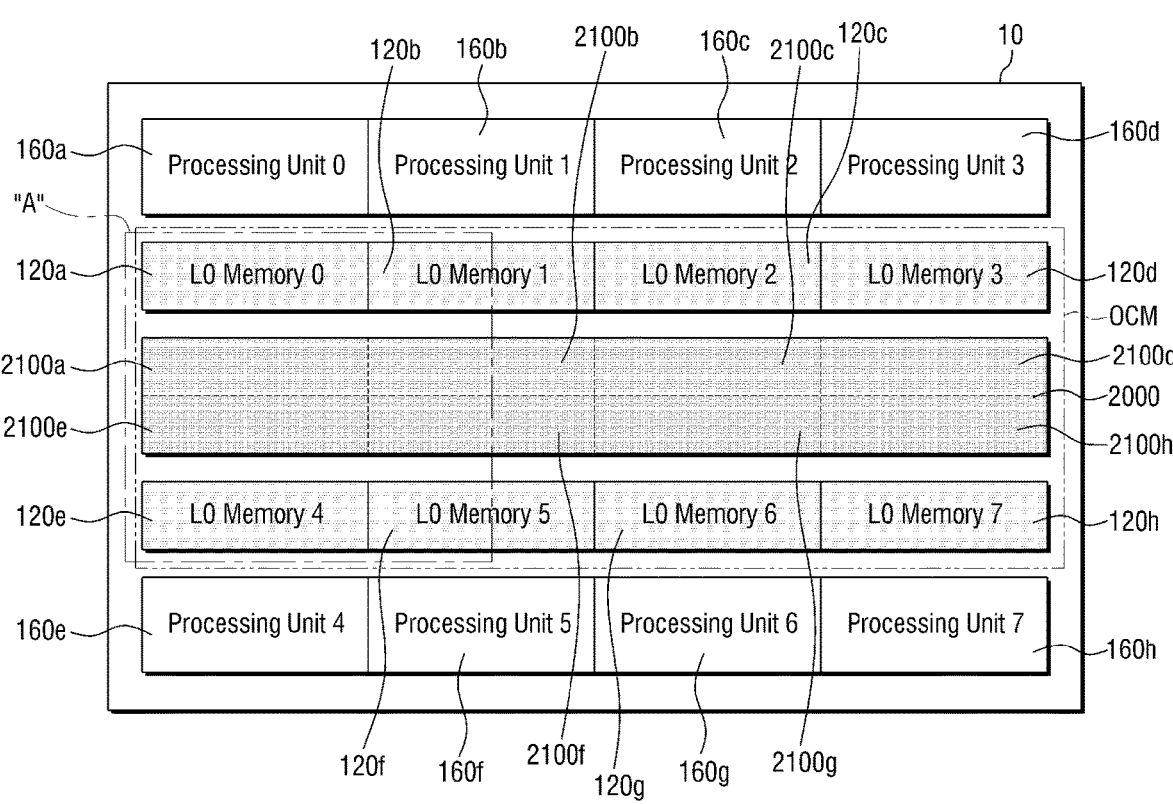
FIG. 24 is a block diagram for illustrating memory reconstruction of the neural processing system of FIG. 1.

FIG. 24 is a block diagram for illustrating memory reconfiguration of a neural processing system in accordance with some embodiments of the present inventive concept.

With reference to FIG. 24, the neural core SoC 10 may include first to eighth processing units 160a to 160h and an on-chip memory OCM. Although FIG. 24 illustrates eight processing units as an example, this is merely illustrative, and the number of processing units may vary as desired.

The on-chip memory OCM may include first to eighth L0 memories 120a to 120h and a shared memory 2000.

The first to eighth L0 memories 120a to 120h may be used as private memories for the first to eighth processing units 160a to 160h, respectively. In other words, the first to eighth processing units 160a to 160h and the first to eighth L0 memories 120a to 120h may correspond to each other 1:1.

The shared memory 2000 may include first to eighth memory units 2100a to 2100h. The first to eighth memory units 2100a to 2100h may correspond to the first to eighth processing units 160a to 160h and the first to eighth L0 memories 120a to 120h, respectively. That is, the number of memory units may be eight, which is the same as the number of processing units and L0 memories.

The shared memory 2000 may operate in one of two kinds of on-chip memory types. In other words, the shared memory 2000 may operate in one of a L0 memory type or a global memory type. In other words, the shared memory 2000 may implement two types of logical memories with one piece of hardware.

If the shared memory 2000 is implemented in the L0 memory type, the shared memory 2000 may operate as a private memory for each of the first to eighth processing units 160a to 160h, just like the first to eighth L0 memories 120a to 120h. The L0 memory can operate at a relatively higher clock speed compared with the global memory, and the shared memory 2000 may also use a relatively higher clock speed when operating in the L0 memory type.

If the shared memory 2000 is implemented in the global memory type, the shared memory 2000 may operate as a common memory used by the first processing unit 100a and the second processing unit 100b together. In this case, the shared memory 2000 may be shared not only by the first to eighth processing units 160a to 160h but also by the first to eighth L0 memories 120a to 120h.

The global memory may generally use a lower clock compared with the L0 memory, but is not limited thereto. When the shared memory 2000 operates in the global memory type, the first to eighth processing units 160a to 160h may share the shared memory 2000. In this case, the shared memory 2000 may be connected to the volatile memory 32 of FIG. 2 via the global interconnection 5000 and may also operate as a buffer for the volatile memory 32.

At least part of the shared memory 2000 may operate in the L0 memory type, and the rest may operate in the global memory type. In other words, the entire shared memory 2000 may operate in the L0 memory type, or the entire shared memory 2000 may operate in the global memory type. Alternatively, part of the shared memory 2000 may operate in the L0 memory type, and the rest may operate in the global memory type.

Figure 25:
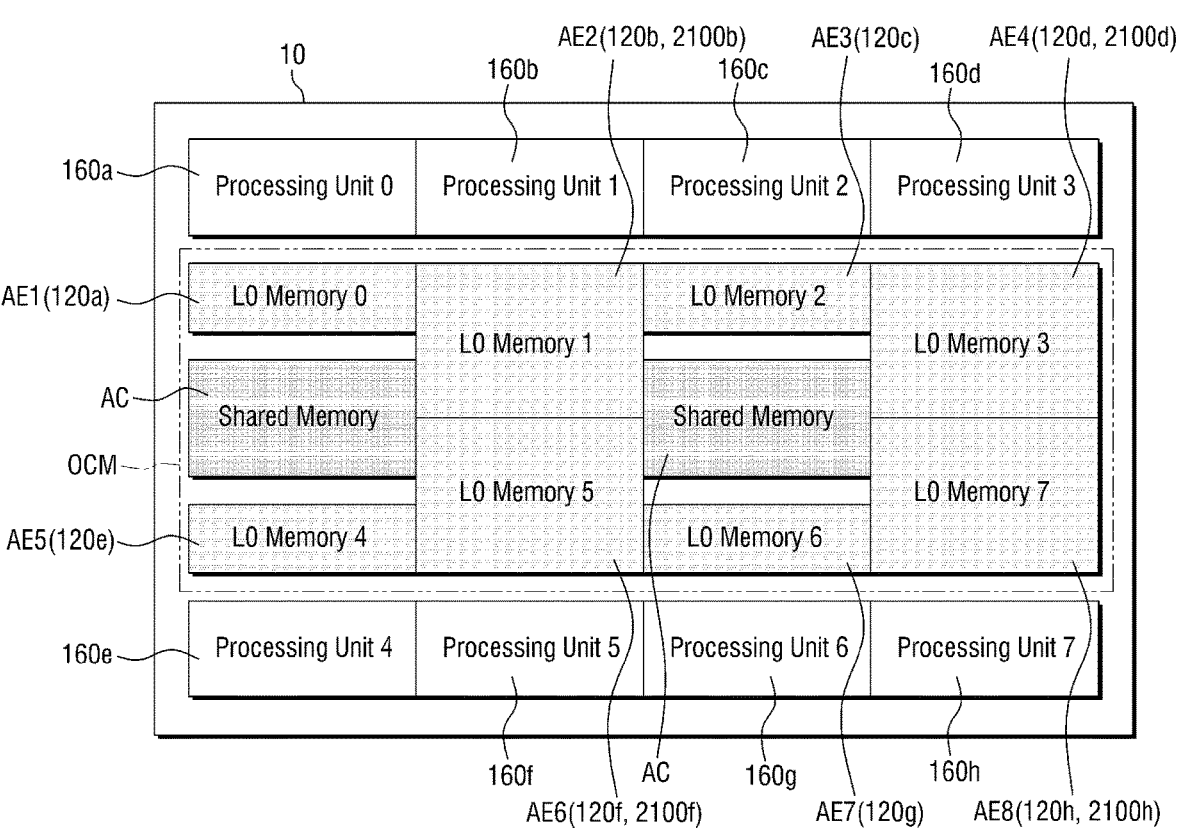
FIG. 25 is a block diagram showing an example of memory reconstruction of the neural processing system of FIG. 1.

FIG. 25 is a block diagram showing an example of memory reconstruction of a neural processing system in accordance with some embodiments of the present inventive concept.

With reference to FIGS. 24 and 25, first, third, fifth, and seventh dedicated areas AE1, AE3, AE5, and AE7 for each of the first, third, fifth, and seventh processing units 100a, 100c, 100e, and 100g may include only the first, third, fifth, and seventh L0 memories 120a, 120c, 120e, and 120g, respectively. Further, second, fourth, sixth, and eighth dedicated areas AE2, AE4, AE6, and AE8 for each of the second, fourth, sixth, and eighth processing units 100b, 100d, 100f, and 100h may include second, fourth, sixth, and eighth L0 memories 120b, 120d, 120f, and 120h, respectively. In addition, the second, fourth, sixth, and eighth dedicated areas AE2, AE4, AE6, and AE8 may include the second, fourth, sixth, and eighth memory units 2100b, 2100d, 2100f, and 2100h. The first, third, fifth, and seventh memory units 2100a, 2100c, 2100e, and 2100g of the shared memory 2000 may be used as a common area AC.

The common area AC may be a memory shared by the first to eighth processing units 160a to 160h. The second dedicated area AE2 may include a second L0 memory 120b and a second memory unit 2100b. The second dedicated area AE2 may be an area in which the second L0 memory 120b and the second memory unit 210b that are separated hardware-wise operate in the same manner and operate logically as one L0 memory. The fourth, sixth, and eighth dedicated areas AE4, AE6, and AE8 may also operate in the same manner as the second dedicated area AE2.

The shared memory 2000 in accordance with the present embodiment may convert an area corresponding to each neural core into a logical L0 memory and a logical global memory of an optimized ratio and may use them. The shared memory 2000 may perform the adjustment of this ratio at runtime.

That is, each neural core may perform the same task in some cases, but may perform different tasks in other cases as well. In this case, the amount of the L0 memory and the amount of the global memory required for the tasks carried out by each neural core are inevitably different each time. Accordingly, if the composition ratio of the L0 memory and the shared memory is fixedly set as in the conventional on-chip memory, there may occur inefficiency due to the calculation tasks assigned to each neural core.

Therefore, the shared memory 2000 of the neural processing device in accordance with the present embodiment may set an optimal ratio of the L0 memory and the global memory according to calculation tasks during the runtime, and may enhance the efficiency and speed of calculation.

Figure 26:
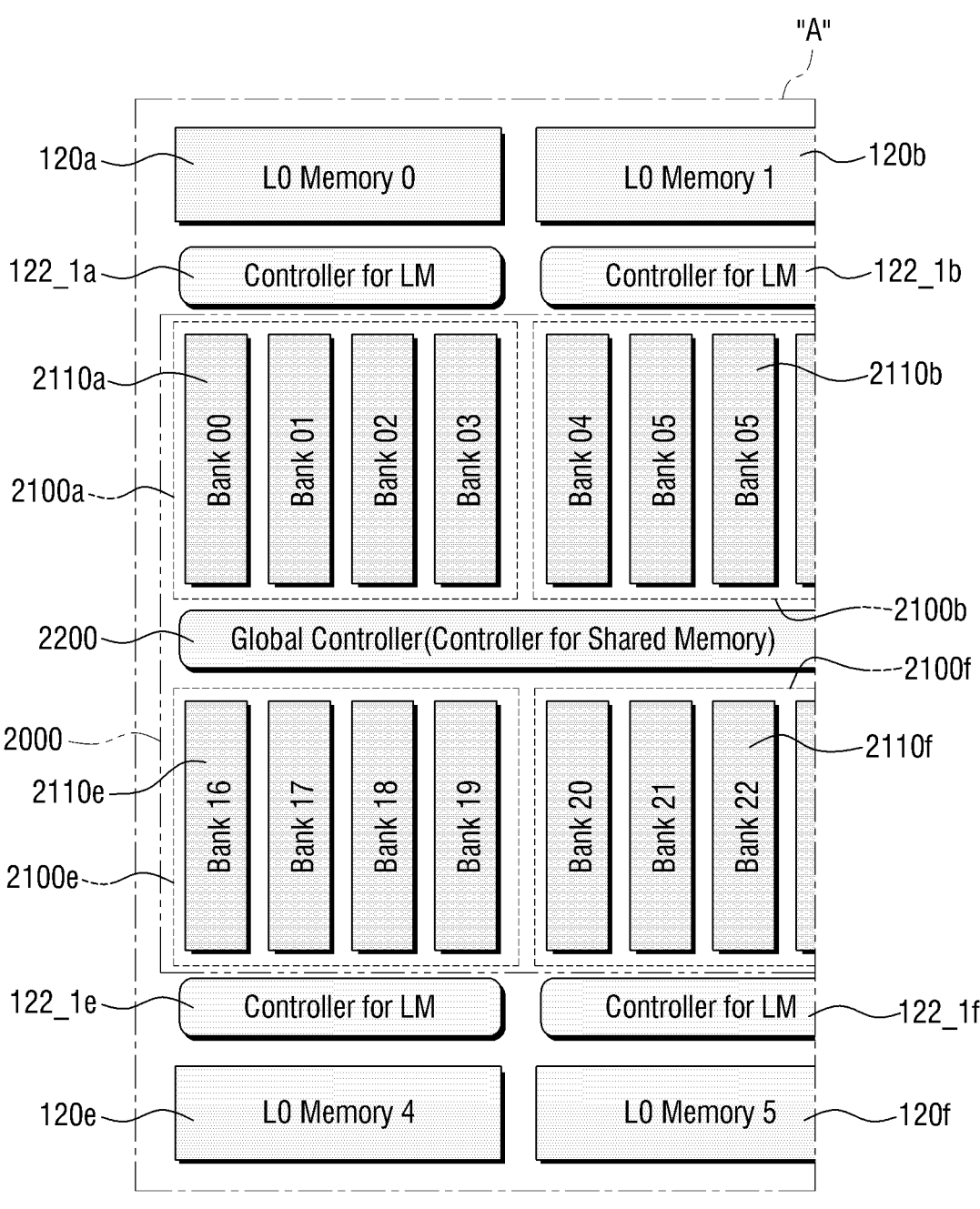
FIG. 26 is an enlarged block diagram of a portion A of FIG. 24.

FIG. 26 is an enlarged block diagram of a portion A of FIG. 24.

With reference to FIGS. 24 and 26, the shared memory 2000 may include a first L0 memory controller 122_1a, a second L0 memory controller 122_1b, a fifth L0 memory controller 122_1e, a sixth L0 memory controller 122_1f, the first to eighth memory units 2100a to 2100h, and a global controller 2200. Other L0 memory controllers not shown may also be included in the present embodiment, but the description thereof will be omitted for convenience.

The first L0 memory controller 122_1a may control the first L0 memory 120a. In addition, the first L0 memory controller 122_1a may control the first memory unit 2100a. Specifically, when the first memory unit 2100a is implemented in a logical L0 memory type, the control by the first L0 memory controller 122_1a may be performed on the first memory unit 2100a.

The second L0 memory controller 122_1b may control the second L0 memory 120b. Further, the second L0 memory controller 122_1b may control the second memory unit 2100b. In other words, when the second memory unit 2100b is implemented in the logical L0 memory type, the control by the first L0 memory controller 122_1a may be performed on the second memory unit 2100b.

The fifth L0 memory controller 122_1e may control the fifth L0 memory 120e. Further, the fifth L0 memory controller 122_1e may control the fifth memory unit 2100e. In other words, when the fifth memory unit 2100e is implemented in the logical L0 memory type, the control by the fifth L0 memory controller 122_1e may be performed on the fifth memory unit 2100e.

The sixth L0 memory controller 122_1f may control the sixth L0 memory 120f. Further, the sixth L0 memory controller 122_1f may control the sixth memory unit 2100f. In other words, when the sixth memory unit 2100f is implemented in the logical L0 memory type, the control by the sixth L0 memory controller 122_1f may be performed on the sixth memory unit 2100f.

The global controller 2200 may control all of the first to eighth memory units 2100a to 2100h. Specifically, the global controller 2200 may control the first memory unit 2100a to the eighth memory unit 2100h when the first to eighth memory units 2100a to 2100h each operate logically in the global memory type (i.e., when they do not operate logically in the L0 memory type).

In other words, the first to eighth memory units 2100a to 2100h may be controlled by the first to eighth L0 memory controllers 122_1a to 122_1h, respectively, or may be controlled by the global controller 2200, depending on what type of memory they are logically implemented in.

If the L0 memory controllers including the first, second, fifth, and sixth L0 memory controllers 122_1a, 122_1b, 122_1e, and 122_1f control the first to eighth memory units 2100a to 2100h, respectively, the first to eighth L0 memory controllers 122_1a to 141h control the first to eighth memory units 2100a to 2100h in the same manner as the first to eighth L0 memories 120a to 120h, and thus, can control them as the private memory of the first to eighth processing units 160a to 160h. Accordingly, the first to eighth memory units 2100a to 2100h may operate at clock frequencies corresponding to the clock frequencies of the first to eighth processing units 160a to 160h.

The L0 memory controllers including the first L0 memory controller 122_1a, the second L0 memory controller 122_1b, the fifth L0 memory controller 122_1e, and the sixth L0 memory controller 122_1f may each include the LSU 110 of FIG. 7.

If the global controller 2200 controls at least one of the first to eighth memory units 2100a to 2100h, respectively, then the global controller 2200 may control the first to eighth memory units 2100a to 2100h as the global memory of the first to eighth processing units 160a to 160h, respectively. Accordingly, at least one of the first to eighth memory units 2100a to 2100h may operate at a clock frequency independent of the clock frequencies of the first to eighth processing units 160a to 160h, respectively. However, the present embodiment is not limited thereto.

The global controller 2200 may connect the first to eighth memory units 2100a to 2100h with the global interconnection 5000 of FIG. 3. The first to eighth memory units 2100a to 2100h may exchange data with the off-chip memory 30 of FIG. 1 or may exchange data with the first to eighth L0 memories 120a to 120h, respectively, by means of the global controller 2200.

Each of the first to eighth memory units 2100a to 2100h may include at least one memory bank. The first memory unit 2100a may include at least one first memory bank 2110a. The first memory banks 2110a may be areas obtained by dividing the first memory unit 2100a into certain sizes. The respective first memory banks 2110a may all be memory devices of the same size. However, the present embodiment is not limited thereto. FIG. 15 illustrates that four memory banks are included in one memory unit.

Likewise, the second, fifth, and sixth memory units 2100b, 2100e, and 2100f may include at least one second, fifth, and sixth memory banks 2110b, 2110e, and 2110f, respectively.

Hereinafter, the description will be made based on the first memory banks 2110a and the fifth memory banks 2110e, which may be the same as other memory banks including the second and sixth memory banks 2110b and 2110f.

The first memory banks 2110a may each operate logically in the L0 memory type or operate logically in the global memory type. In this case, the first memory banks 2110a may operate independently of the other memory banks in the first memory unit 2100a. However, the present embodiment is not limited thereto.

If each memory bank operates independently, the first memory unit 2100a may include a first area operating in the same manner as the first L0 memory 120a and a second area operating in a different manner from the first L0 memory 120a. In this case, the first area and the second area do not necessarily coexist, but any one area may occupy the entire first memory unit 2100a.

Likewise, the second memory unit 2100b may include a third area operating in the same manner as the second L0 memory 120b and a fourth area operating in a different manner from the second L0 memory 120b. In this case, the third area and the fourth area do not necessarily coexist, and any one area may occupy the entire first memory unit 2100a.

In this case, the ratio of the first area to the second area may be different from the ratio of the third area to the fourth area. However, the present embodiment is not limited thereto. Accordingly, the ratio of the first area to the second area may be the same as the ratio of the third area to the fourth area. In other words, the memory composition ratio in each memory unit may vary as desired.

In general, in the case of the conventional system on a chip, the on-chip memory except for high-speed L0 memory was often composed of high-density, low-power SRAM. This is because SRAM has high efficiency in terms of chip area and power consumption relative to required capacity. However, with the conventional on-chip memory, the processing speed slowed down significantly inevitably in the case of tasks that require more data quickly than the predetermined capacity of the L0 memory, and even when the need for the global memory is not great, there is no way to utilize the remaining global memory, resulting in inefficiency.

On the contrary, the shared memory 2000 in accordance with some embodiments of the present inventive concept may be controlled selectively by any one of the two controllers depending on the cases. In this case, the shared memory 2000 may be controlled not only as a whole by a determined one of the two controllers but also independently for each memory unit or each memory bank.

Through this, the shared memory 2000 in accordance with the present embodiment can obtain an optimal memory composition ratio according to calculation tasks during the runtime and can perform faster and more efficient calculation tasks. In the case of a processing unit specialized in artificial intelligence, the required sizes of L0 memory and global memory may vary for each particular application. Moreover, even for the same application, the required sizes of L0 memory and global memory may vary for each layer when a deep learning network is used. In the shared memory 2000 in accordance with the present embodiment, the composition ratio of the memory can be changed during the runtime even when calculation steps change according to each layer, making fast and efficient deep learning tasks possible.

Figure 27:
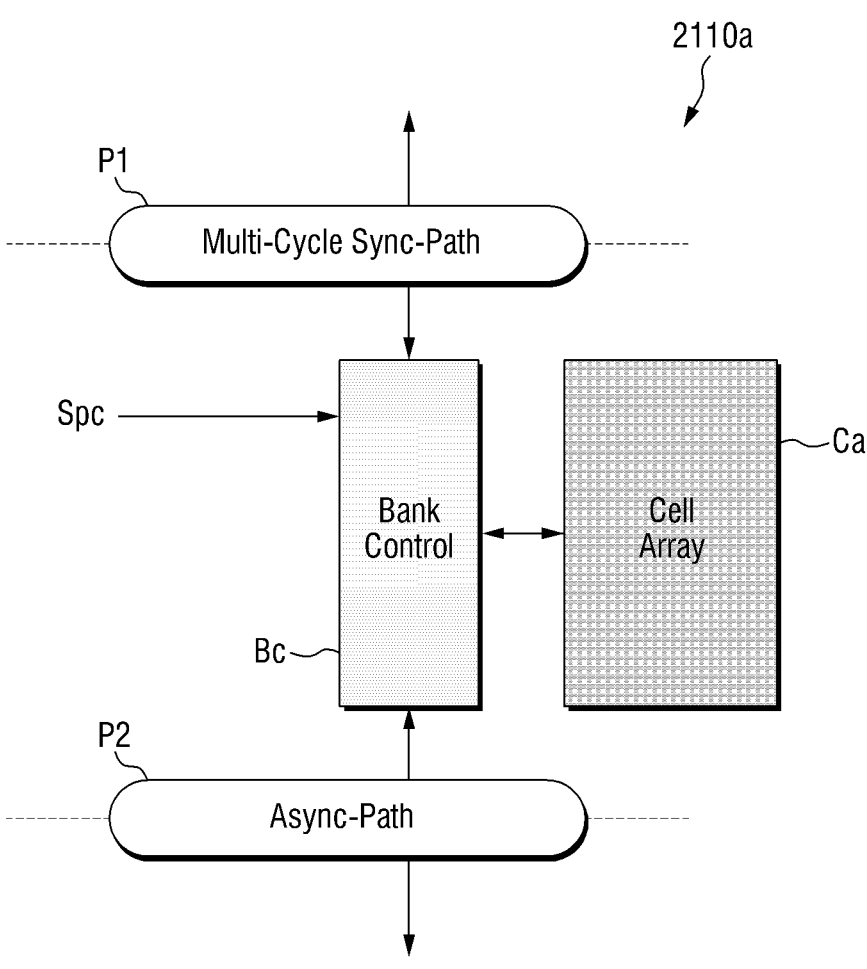
FIG. 27 is a diagram for illustrating in detail the first memory bank of FIG. 26.

FIG. 27 is a diagram for illustrating in detail the first memory bank of FIG. 26. Although FIG. 16 illustrates the first memory bank 2110*a*, other memory banks may also have the same structure as the first memory bank 2110*a*.

With reference to FIG. 27, the first memory bank 2110*a* may include a cell array Ca, a bank controller Bc, a first path unit P1, and a second path unit P2.

The cell array Ca may include a plurality of memory devices (cells) therein. In the cell array Ca, the plurality of memory devices may be arranged in a lattice structure. The cell array Ca may be, for example, a SRAM (static random-access memory) cell array.

The bank controller Bc may control the cell array Ca. The bank controller Bc may determine whether the cell array Ca operates in the L0 memory type or in the global memory type, and may control the cell array Ca accordingly.

Specifically, the bank controller Bc may determine whether to transmit and receive data in the direction of the first path unit P1 or to transmit and receive data in the direction of the second path unit P2 during the runtime. The bank controller Bc may determine a data transmission and reception direction according to a path control signal Spc.

The path control signal Spc may be generated by a pre-designed device driver or compiler. The path control signal Spc may be generated according to the characteristics of calculation tasks. Alternatively, the path control signal Spc may be generated by an input received from a user. That is, the user may directly apply an input to the path control signal Spc in order to select the most optimal memory composition ratio.

The bank controller Bc may determine a path along which the data stored in the cell array Ca are transmitted and received via the path control signal Spc. The exchange interface of data may be changed as the bank controller Bc determines the path along which the data are transmitted and received. That is, a first interface may be used when the bank controller Bc exchanges data with the first path unit P1, and a second interface may be used when the bank controller Bc exchanges data with the second path unit P2. In this case, the first interface and the second interface may be different from each other.

Further, address systems in which data are stored may vary as well. In other words, if a particular interface is selected, then read and write operations may be performed in an address system corresponding thereto.

The bank controller Bc may operate at a particular clock frequency. For example, if the cell array Ca is an SRAM cell array, the bank controller Bc may operate at the operating clock frequency of a general SRAM.

The first path unit P1 may be connected to the bank controller Bc. The first path unit P1 may directly exchange the data of the cell array Ca with the first processing unit 100*a*. In this case, "directly" may mean being exchanged with each other without going through the global interconnection 5000. In other words, the first processing unit 100*a* may exchange data directly with the first L0 memory 120*a*, and the first processing unit 100*a* may exchange data via the first path unit P1 when the shared memory 2000 is implemented logically in the L0 memory type. The first path unit P1 may include L0 memory controllers including the first L0 memory controller 122_1*a* and the second L0 memory controller 122_1*b* of FIG. 14.

The first path unit P1 may form a multi-cycle sync-path. That is, the operating clock frequency of the first path unit P1 may be the same as the operating clock frequency of the first processing unit 100*a*. The first L0 memory 120*a* may quickly exchange data at the same clock frequency as the operating clock frequency of the first processing unit 100*a* in order to quickly exchange data at the same speed as the operation of the first processing unit 100*a*. Likewise, the first path unit P1 may also operate at the same clock frequency as the operating clock frequency of the first processing unit 100*a*.

At this time, the operating clock frequency of the first path unit P1 may be multiples of the operating clock frequency of the bank controller Bc. In this case, a clock domain crossing (CDC) operation for synchronizing the clocks between the bank controller Bc and the first path unit P1 is not needed separately, and thus, a delay of data transmission may not occur. Accordingly, faster and more efficient data exchange can be possible.

In FIG. 27, the operating clock frequency of the first path unit P1 may be 1.5 GHz as an example. This may be twice the frequency of 750 MHz of the bank controller Bc. However, the present embodiment is not limited thereto, and any may be possible as long as the first path unit P1 operates at integer multiples of the clock frequency of the bank controller Bc.

The second path unit P2 may be connected to the bank controller Bc. The second path unit P2 may exchange the data of the cell array Ca with the first processing unit 100*a* not directly but via the global interconnection 5000. In other words, the first processing unit 100*a* may exchange data with the cell array Ca via the global interconnection 5000 and the second path unit P2. In this case, the cell array Ca may exchange data not just with the first processing unit 100*a* but also with other neural cores.

That is, the second path unit P2 may be a data exchange path between the cell array Ca and all the neural cores when the first memory bank 2110a is implemented logically in the global memory type. The second path unit P2 may include the global controller 2200 of FIG. 14.

The second path unit P2 may form an Async-Path. The operating clock frequency of the second path unit P2 may be the same as the operating clock frequency of the global interconnection 5000. Likewise, the second path unit P2 may also operate at the same clock frequency as the operating clock frequency of the global interconnection 5000.

At this time, the operating clock frequency of the second path unit P2 may not be synchronized with the operating clock frequency of the bank controller Bc. In this case, the clock domain crossing (CDC) operation for synchronizing the clocks between the bank controller Bc and the second path unit P2 may be necessary. If the operating clock frequency of the bank controller Bc and the operating clock frequency of the second path unit P2 are not synchronized with each other, the degree of freedom in the design of the clock domain may be increased. Therefore, the difficulty of hardware design is decreased, thereby making it possible to more easily derive the hardware operation.

The bank controller Bc may use different address systems in the case of exchanging data via the first path unit P1 and in the case of exchanging data via the second path unit P2. In other words, the bank controller Bc may use a first address system if via the first path unit P1 and a second address system if via the second path unit P2. In this case, the first address system and the second address system may be different from each other.

The bank controller Bc does not necessarily have to be present for each memory bank. In other words, the bank controller Bc is not a part for scheduling but serves to transmit signals, and thus, is not an essential part for each memory bank having two ports. Therefore, one bank controller Bc can control multiple memory banks. The multiple memory banks may operate independently even if they are controlled by the bank controller Bc. However, the present embodiment is not limited thereto.

As a matter of course, the bank controller Bc may be present for each memory bank. In this case, the bank controller Bc may control each memory bank individually.

With reference to FIG. 26 and FIG. 27, if the first memory unit 210a exchanges data via the first path unit P1, the first address system may be used, and if the first memory unit 210a exchanges data via the second path unit P2, the second address system may be used. Likewise, if the second memory unit 210b exchanges data via the first path unit P1, a third address system may be used, and if the second memory unit 210b exchanges data via the second path unit P2, the second address system may be used. In this case, the first address system and the third address system may be the same as each other. However, the present embodiment is not limited thereto.

The first address system and the third address system may each be used exclusively for the first processing unit 100a and the second processing unit 100b, respectively. The second address system may be commonly applied to the first processing unit 100a and the second processing unit 100b.

In FIG. 15, the operating clock frequency of the second path unit P2 may operate at 1 GHz as an example. This may be a frequency that is not synchronized with the operating clock frequency of 750 MHz of the bank controller Bc. In other words, the operating clock frequency of the second path unit P2 may be freely set without being dependent on the operating clock frequency of the bank controller Bc at all.

A generic global memory has used slow SRAM (e.g., 750 MHz) and a global interconnection (e.g., 1 GHz) faster than that, inevitably resulting in delays due to the CDC operation. On the contrary, the shared memory 2000 in accordance with some embodiments of the present inventive concept has room to use the first path unit P1 in addition to the second path unit P2, thereby making it possible to avoid delays resulting from the CDC operation.

Furthermore, in the generic global memory, a plurality of neural cores use one global interconnection 5000, and thus, when an amount of data transfer occurs at the same time, the decrease in the overall processing speed is likely to occur. On the contrary, the shared memory 2000 in accordance with some embodiments of the present inventive concept has room to use the first path unit P1 in addition to the second path unit P2, thereby making it possible to achieve the effect of properly distributing the data throughput that could be concentrated on the global controller 2200 as well.

Figure 28:
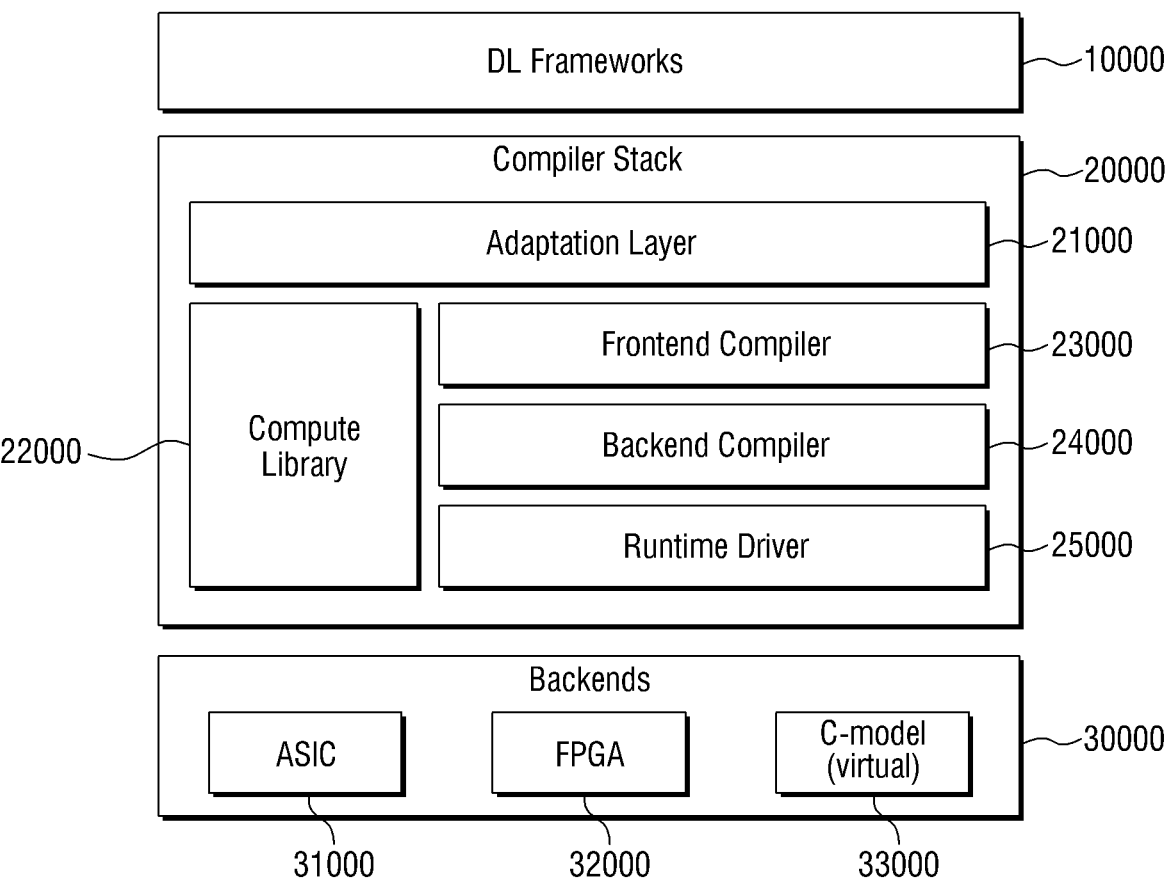
FIG. 28 is a block diagram for illustrating a software hierarchy of the neural processing device of FIG. 1.

FIG. 28 is a block diagram for illustrating a software hierarchy of a neural processing device in accordance with some embodiments of the present inventive concept.

With reference to FIG. 28, the software hierarchy of the neural processing device in accordance with some embodiments of the present inventive concept may include a DL framework 10000, a compiler stack 20000, and a back-end module 30000.

The DL framework 10000 may mean a framework for a deep learning model network used by a user. For example, a neural network that has finished training may be generated using programs such as TensorFlow or PyTorch.

The compiler stack 20000 may include an adaptation layer 21000, a compute library 22000, a front-end compiler 23000, a back-end compiler 24000, and a runtime driver 25000.

The adaptation layer 21000 may be a layer in contact with the DL framework 10000. The adaptation layer 21000 may quantize a neural network model of a user generated by the DL framework 10000 and modify graphs. Moreover, the adaptation layer 21000 may convert the type of model into a required type.

The front-end compiler 23000 may convert various neural network models and graphs transferred from the adaptation layer 21000 into a certain intermediate representation IR. The converted IR may be a preset representation that is easy to handle later by the back-end compiler 24000.

The optimization that can be carried out in advance in the graph level may be performed on such an IR of the front-end compiler 23000. In addition, the front-end compiler 23000 may finally generate the IR via the task of converting it into a layout optimized for hardware.

The back-end compiler 24000 optimizes the IR converted by the front-end compiler 23000 and converts it into a binary file, enabling it to be used by the runtime driver. The back-end compiler 24000 may generate an optimized code by dividing a job in a scale that fits the details of hardware.

The compute library 22000 may store template operations designed in a form suitable for hardware among various operations. The compute library 22000 provides the back-end compiler 24000 with multiple template operations required by hardware, enabling the optimized code to be generated.

The runtime driver 25000 may continuously perform monitoring during driving, thereby making it possible to drive the neural network device in accordance with some embodiments of the present inventive concept. Specifically, it may be responsible for the execution of an interface of the neural network device.

The back-end module 30000 may include an ASIC (application-specific integrated circuit) 31000, an FPGA (field-programmable gate array) 32000, and a C-model 33000. The ASIC 31000 may refer to a hardware chip determined according to a predetermined design method. The FPGA 32000 may be a programmable hardware chip. The C-model 33000 may refer to a model implemented by simulating hardware on software.

The back-end module 30000 may perform various tasks and derive results by using the binary code generated via the compiler stack 20000.

In the following, a method for pruning of a neural processing device in accordance with some embodiments of the present inventive concept will be described with reference to FIGS. 11, 19, and 29 to 31. The parts overlapping with the embodiments described above will be omitted or simplified.

Figure 29:
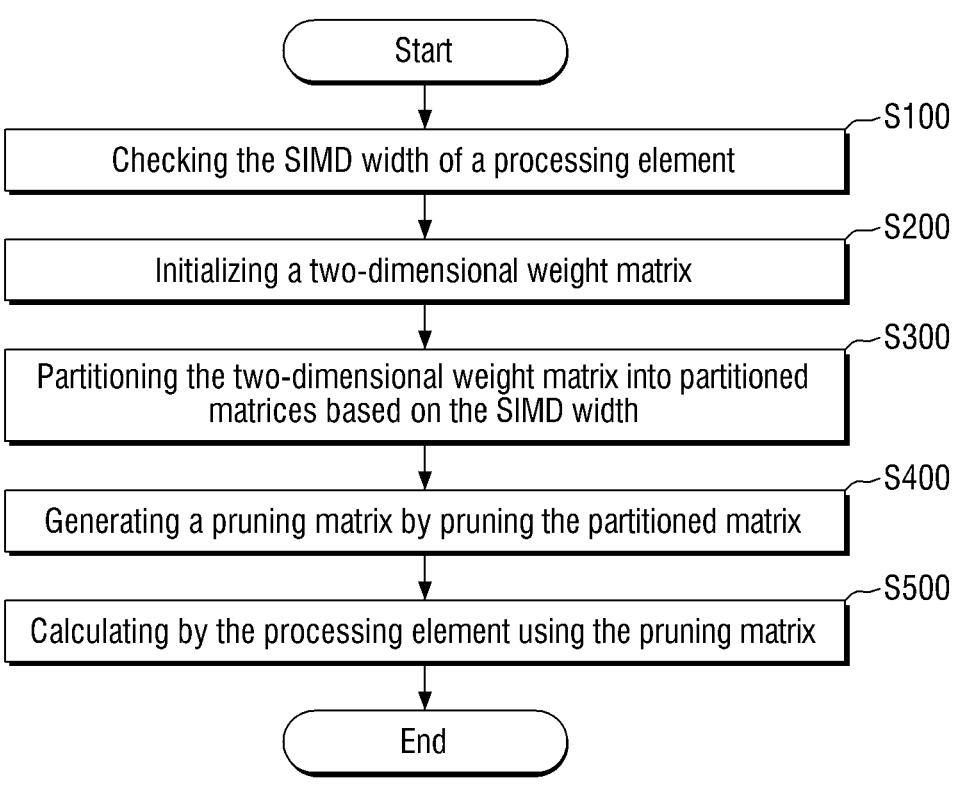
FIG. 29 is a flowchart for illustrating a method for pruning of a neural processing device in accordance with some embodiments of the present inventive concept.

FIG. 29 is a flowchart for illustrating a method for pruning of a neural processing device in accordance with some embodiments of the present inventive concept, and FIG. 30 is a flowchart for illustrating in detail the step of generating a pruning matrix of FIG. 29. FIG. 31 is a flowchart for illustrating in detail the step of generating an updated threshold value of FIG. 30.

Referring to FIG. 29, the SIMD width of a processing element is checked (S100).

Specifically, referring to FIG. 11, the width identifier 131 may receive the width information Iwd for the SIMD width of the processing element from the processing unit 160. The width identifier 131 may transmit the width information Iwd to the matrix divider 133. Further, the width identifier 131 may transmit a confirmation signal Ds to the weight initializer 132. At this time, the confirmation signal Ds may be information indicating that the width information Iwd has been received and preparation for weight initialization has been completed. The width identifier 131 may store the width information Iwd after first identifying the SIMD width of the processing element. Accordingly, the width information Iwd can be received only once for the first time. In this case, it is possible to check whether the width information Iwd is stored internally and generate a confirmation signal Ds.

Referring to FIG. 29 again, the two-dimensional weight matrix is initialized (S200).

Specifically, referring to FIG. 11, the weight initializer 132 may receive the two-dimensional weight matrix Mtx_W and initialize the weights. Initialization may be performed via the weight initializer 132, or a two-dimensional weight matrix Mtx_W containing pre-initialized values may be received as well. The initialization may use any value or a preset value.

Referring to FIG. 29 again, the two-dimensional weight matrix is partitioned into partitioned matrices based on the SIMD width (S300).

Specifically, referring to FIG. 11, the matrix divider 133 may partition the two-dimensional weight matrix Mtx_W to thereby generate the partitioned matrices Mtx_Wg. At this time, the matrix divider 133 may receive the width information Iwd and determine the size of the partitioned matrices Mtx_Wg. That is, the partitioned matrices Mtx_Wg are of the size of the partitioned regions MX11 to MXmn, and their sizes may be determined according to the SIMD width. As a matter of course, the partitioned matrices Mtx_Wg may be plural.

Referring to FIG. 29 again, a pruning matrix is generated by pruning the partitioned matrix (S400).

In detail, referring to FIG. 30, dry run information is generated by pruning with an initial threshold value (S410).

Specifically, referring to FIG. 19, the pruner 134 may receive an initial threshold value Ith_g and perform a dry run. The dry run may mean performing pruning using the initial threshold value Ith_g prior to the final execution. The pruner 134 may generate the results of executing the dry run into dry run information Idry. The pruner 134 may transmit the dry run information Idry to the load balance unit 135.

Referring to FIG. 30 again, counting information is generated by counting the zero groups via the dry run information (S420).

Specifically, referring to FIG. 20, the zero group counter 135_1 may receive the dry run information Idry and check the pruning result according to the dry run. The zero group counter 135_1 may count the number of generated zero groups Gz in the pruning result, thereby generating counting information Ic. The counting information Ic may be information for determining the number of zero groups Gz in each partitioned matrix Mtx_Wg unit.

Referring to FIG. 30 again, an updated threshold value is generated based on the counting information (S430).

In detail, referring to FIG. 31, a reference partitioned matrix is selected (S431).

Specifically, referring to FIGS. 17, 18, and 20, the threshold updater 135_2 may select the partitioned matrix Mtx_Wg of the third weight register WR3 having the largest number of zero groups Gz as a reference partitioned matrix according to the counting information Ic.

Referring to FIG. 31 again, the initial threshold value of the reference partitioned matrix is maintained (S432).

Specifically, referring to FIGS. 17, 18, and 20, since the reference partitioned matrix includes the largest number of zero groups Gz, it may not be necessary to adjust the initial threshold value Ith_g. In other words, since the load balancing task is to reduce the difference between the numbers of zero groups Gz of the reference partitioned matrix Mtx_Wg and the other partitioned matrices Mtx_Wg, it may not be necessary to modify the initial threshold value Ith_g of the reference partitioned matrix. Therefore, the initial threshold value Ith_g of the reference partitioned matrix may remain unchanged during several epochs in the training stage.

Referring to FIG. 31 again, updated threshold values are generated by adjusting the threshold values of the remaining partitioned matrices (S433).

Specifically, referring to FIGS. 17, 18, and 20, the initial threshold values Ith_g of the remaining partitioned matrices Mtx_Wg other than the reference partitioned matrix, i.e., the partitioned matrices Mtx_Wg of the first weight register WR1 and the second weight register WR2 may be adjusted to the updated threshold values Ith_up.

Referring to FIG. 30 again, a pruning matrix is generated by pruning the partitioned matrix with the updated threshold value (S440).

Specifically, referring to FIG. 19, the pruner 134 may perform pruning using the updated threshold value Ith_up, and may generate the pruning matrix Mtx_Wp through this.

Referring to FIG. 29 again, the processing element calculates using the pruning matrix (S500).

Specifically, referring to FIG. 14, the weight register WR may receive and temporarily store the pruning matrix Mtx_Wp. The input activation register AR may receive an activation matrix AMX as an input. The multiplier Mul may multiply the elements of the first pruning matrix Mtx11 with the elements of the activation matrix AMX. The multiplier Mul may include a plurality of multipliers and thus perform multiplication in parallel. Each multiplier may perform a multiplication between the elements of each matrix. The multiplier Mul may transmit the multiplication result to the accumulator ACC. The multiplier Mul may multiply a row of the first pruning matrix Mtx11 and a column of the activation matrix AMX with each other. In this case, the rows of the first pruning matrix Mtx11 are groups, and if one of the groups is a zero group, the multiplication has a result of 0, so the multiplication may be skipped without having to be performed.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims. It is therefore desired that the present embodiments be considered in all respects as illustrative and not restrictive, reference being made to the appended claims rather than the foregoing description to indicate the scope of the invention.

What is claimed is:

1. A neural processing device having a neural core, comprising:
processing circuitry configured to perform deep learning calculation tasks; and
an L0 memory configured to store input data and output data of the processing circuitry, wherein the input and output data includes a two-dimensional weight matrix,
wherein weight manipulator circuitry of the neural core:
receives the two-dimensional weight matrix from the L0 memory;
checks a width of an SIMD (Single Instruction/Multiple Data) input of a processing element that then generates and sends a confirmation signal to a weight initializer circuitry that, upon receiving the confirmation signal, initializes the two-dimensional weight matrix;
partitions the two-dimensional weight matrix into preset sizes according to a width of the SIMD input of the processing element that then generates at least one partitioned matrix;
counts a number of zero groups in the at least one partitioned matrix based on an initial threshold value to generate counting information;
selects a partitioned matrix of the at least one partitioned matrix having a largest number of zero groups in the counting information as a reference partitioned matrix;
adjusts at least one threshold value of at least one remaining partitioned matrix of the at least one partitioned matrix other than the reference partitioned matrix to obtain an updated threshold value;
prunes the at least one partitioned matrix by using the updated threshold value for controlling the number of zero groups included in each of the at least one partitioned matrix to generate a pruning matrix; and
transmits the pruning matrix as output data signal to the processing circuitry.

2. The neural processing device of claim 1,
wherein the processing circuitry comprises a processing element array (PE array) that performs two-dimensional calculations and includes at least one processing element.

3. The neural processing device of claim 1, wherein the at least one partitioned matrix contains at least one group, and

a number of elements in the at least one group is equal to the width of the SIMD input of the processing element.

4. The neural processing device of claim 3, wherein the neural core further:
generates a representative value of the at least one group,
compares the representative value with the updated threshold value, and
determines whether to convert the at least one group into a zero group.

5. The neural processing device of claim 4, wherein the two-dimensional weight matrix contains weights as elements, and
the weights and the updated threshold value are trained via an artificial neural network.

6. The neural processing device of claim 4, wherein the weight manipulator circuitry of the neural core further:
performs pruning through the initial threshold value to generate dry run information, and counts the number of zero groups based on the dry run information to generate counting information.

7. The neural processing device of claim 6, wherein the weight manipulator circuitry of the neural core further:
receives the dry run information at a load balance circuitry that generates the updated threshold value.

8. The neural processing device of claim 7, wherein when the load balance circuitry:
receives the dry run information, a zero group counter counts the zero groups, generates the counting information, and transmits the counting information to a threshold updater circuitry that receives the counting information and generates the updated threshold value.

9. The neural processing device of claim 6, wherein the updated threshold value comprises a partitioned matrix threshold value corresponding to each partitioned matrix of the at least one partitioned matrix.

10. A method for pruning of a neural processing device comprising at least one neural core of the neural processing device including processing circuitry for deep learning calculation tasks performing operations according to stored instructions, the method comprising:
receiving, by weight manipulator circuitry, a two-dimensional weight matrix;
checking, by the weight manipulator circuitry, a width of an SIMD (Single Instruction/Multiple Data) input of a processing element that then generates and sends a confirmation signal to a weight initializer circuitry that, upon receiving the confirmation signal, initializes the two-dimensional weight matrix;
partitioning, by the weight manipulator circuitry, the two-dimensional weight matrix into at least one partitioned matrix based on a width of the SIMD input;
counting a number of zero groups in the at least one partitioned matrix based on an initial threshold value to generate counting information;
selecting a partitioned matrix of the at least one partitioned matrix having a largest number of zero groups in the counting information as a reference partitioned matrix;
adjusting at least one threshold value of at least one remaining partitioned matrix of the at least one partitioned matrix other than the reference partitioned matrix to generate an updated threshold value;
pruning the at least one partitioned matrix by using the updated threshold value for controlling the number of zero groups included in each of the at least one partitioned matrix to generate a pruning matrix; and transmitting, by the weight manipulator circuitry, the pruning matrix as an output data signal to the processing circuitry.

11. The method for pruning of a neural processing device of claim 10, wherein the pruning comprises:

generating a representative value of a first group, changing the first group to a zero group if the representative value is less than or equal to the updated threshold value, and wherein the at least one partitioned matrix contains at least one group and the first group of the at least one group has a size equal to the width of the SIMD.

12. The method for pruning of a neural processing device of claim 11, wherein the representative value comprises any one of a mean value, a minimum value, a maximum value, a median value, and a root mean square (RMS) value.

13. The method for pruning of a neural processing device of claim 10, further comprising:

after the receiving, checking, by the weight manipulator circuitry, the width of the SIMD input of a processing element; and initializing, by the weight manipulator circuitry, the two-dimensional weight matrix.

14. The method for pruning of a neural processing device of claim 10, wherein counting the number of zero groups comprises:

generating dry run information by pruning with the initial threshold value; and generating counting information by counting a number of zero groups based on the dry run information.

15. The method for pruning of neural processing device of claim 11, further comprising:

maintaining the initial threshold value of the reference partitioned matrix.

16. The method for pruning of a neural processing device of claim 10, wherein pruning the at least one partitioned matrix further comprises:

performing, by the processing element, calculations using the pruning matrix.

17. The method for pruning of a neural processing device of claim 16, wherein the pruning matrix contains at least one group, wherein the at least one group comprises a zero group in which all elements are zero and a non-zero group in which at least one non-zero element is included, and wherein the performing calculations comprises skipping a calculation of the zero group.

18. The method for pruning of a neural processing device of claim 10, wherein the two-dimensional weight matrix is a form obtained by rearranging a four-dimensional tensor in two dimensions.

* * * * *